US012710657B2

(12) United States Patent
Boss et al.

(10) Patent No.: US 12,710,657 B2
(45) Date of Patent: Aug. 18, 2026

(54) EXTENDED REALITY SYSTEM INCLUDING AI-ASSISTED IMAGE CAPTURE OPTICAL CHARACTER RECOGNITION FOR USE WITH VISUAL AID CORRECTION FOR LOW VISION

(71) Applicant: Raytrx, LLC, Tulsa, OK (US)

(72) Inventors: Jordan Boss, Tulsa, OK (US); Michael H. Freeman, J. D., Tulsa, OK (US); Mitchael C. Freeman, Tulsa, OK (US); Montgomery H. F. Freeman, Tulsa, OK (US); Behnam Rafiee, Tulsa, OK (US); Ian Oswald, Tulsa, OK (US); Victoria McArtor, Tulsa, OK (US); Sean Fudenna, Tulsa, OK (US)

(73) Assignee: Raytrx, LLC, Tulsa, OK (US)

( * ) Notice: Subject to any disclaimer, the term of this patent is extended or adjusted under 35 U.S.C. 154(b) by 43 days.

(21) Appl. No.: 19/015,159

(22) Filed: Jan. 9, 2025

(65) Prior Publication Data

US 2025/0224612 A1 Jul. 10, 2025

Related U.S. Application Data

(60) Provisional application No. 63/619,246, filed on Jan. 9, 2024.

(51) Int. Cl.
*G02B 27/01* (2006.01)
*G06V 30/26* (2022.01)

(52) U.S. Cl.
CPC ......... *G02B 27/0172* (2013.01); *G06V 30/26* (2022.01); *G02B 2027/0178* (2013.01)

(58) Field of Classification Search
CPC ........ G02B 27/0172; G02B 2027/0178; G02B 27/017; G02B 2027/0138; G02B 2027/014; G06V 30/26; G06V 20/20; G06F 3/013; G06F 3/0346; G06F 3/04815; G06F 3/04842; G06F 3/011; G06F 2203/012
See application file for complete search history.

(56) References Cited

U.S. PATENT DOCUMENTS 9,955,862 B2 * 5/2018 Freeman ................ G16H 10/60
11,112,611 B1 9/2021 Kessler et al.
12,228,741 B2 2/2025 Kessler et al.
2020/0111843 A1 * 4/2020 Han ...................... G06F 3/0412
2025/0029406 A1 * 1/2025 Kim ....................... G06V 10/70

* cited by examiner

*Primary Examiner* — Chanh D Nguyen
*Assistant Examiner* — Jarurat Suteerawongsa
(74) *Attorney, Agent, or Firm* — Howard & Howard Attorneys PLLC

(57) ABSTRACT

An extended reality (XR) system is described herein. The XR system includes a display system mounted to the headset for displaying a display screen including computer-generated images thereon, and a controller that includes one or more processors programmed to execute an algorithm for operating in an optical character recognition (OCR) mode to display a text selection screen by generating an image distortion zone within the text selection screen associated with a non-viewable boundary and modifying received video images to adjust a viewable image attribute of a portion of the received video images displayed within the image distortion zone, and operating in the scrolling text mode to display a text display screen by generating machine-readable text OCR and modifying the generating machine-readable text using a lightweight language model for text correction.

20 Claims, 22 Drawing Sheets

FIG. 11
FIG. 12
26
42
56
54
48
The Bulletin
EMBRACING CHAOS
Airplane re firm lands in Prinevil
HOLIDAY CHE
Thousands line the streets do
County rais
uents
28
58
48
60
Airpla ne repair firm
The Bulletin
HOLIDAY CH
lands in Prinevil

EXTENDED REALITY SYSTEM INCLUDING AI-ASSISTED IMAGE CAPTURE OPTICAL CHARACTER RECOGNITION FOR USE WITH VISUAL AID CORRECTION FOR LOW VISION

CROSS REFERENCE TO RELATED APPLICATIONS

This application claims the benefit of U.S. Provisional application Ser. No. 63/619,246 filed on Jan. 9, 2024, the disclosures of which are hereby incorporated by reference in their entirety and for all purposes.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file, or records, but reserves all copyrights whatsoever in the subject matter presented herein.

TECHNICAL FIELD

The present disclosure generally relates to extended reality (XR) systems including AI-assisted image capture optical character recognition for use with visual aid correction for users with low vision.

BACKGROUND

Low vision, such as Macular degeneration (AMD), macular hole, and other FOV (Field of Vision) related blindness or vision defect conditions, such as central macular scar, histoplasmosis, end-stage glaucoma, Stargardt's disease, central serous retinopathy, myopic macular degeneration, diabetic macular edema, cystoid macular edema, macular holes, macular atrophy, central macular scar, histoplasmosis, macular hole, anterior ischemic optic neuropathy, and retinitas pigmentosa, are often irreversible. The impact to a patient's life due to the loss of a portion of their vision is enormous, including degraded and loss of the ability to read, watch TV, and see computer screens. Some of the conditions can be halted, and fortunately leaves some of the vision intact, and in the case of macular hole or macular degeneration, the peripheral vision remains intact; while in the case of retinitas pigmentosa the peripheral vision is lost and only "tunnel vision" remains. In each of these cases, augmentation of a projected image with pixel manipulation together with real world visual information, "mixed reality" can aid the patient in recovering some or all of their sight.

There have been previous attempts to augment the sight of a patient whose other sight is defective or otherwise impaired, or otherwise compensate for the patient's damaged or impaired sight. For instance, previous efforts have focused on devices that increase the intensity or contrast of the patient's sight and/or increase the magnification of the image seen by the patient while wearing Virtual Reality goggles, which block all other external sight. These attempts have not been very effective, are bulky and expensive, and are presented only in an immersive, occluded, ensconced virtual reality (VR) type of viewing environment, meaning that the patient's existing real-world sight is restricted and the patient can only see what is projected onto that display, while everything else is blocked out. Thus, the patent using these VR type goggles loses the ability to see what is actual around him or her with any remaining sight. This is a disadvantage because a person wearing VR type googles and some AR glasses, which use wave guides that mechanically necessarily restrict the peripheral view, cannot completely see how to move in their environment, walk, or navigate steps or the immediate environment around him or her, so that the display is only potentially useful when sitting or remaining stationary. This causes any user to have to remove the goggles from their eyes to be able to receive actual visual clues from the real-world environment; a serious limitation of this type of application. Another limitation with these type VR goggles or AR glasses is that they do not bear an accurate relation to the real world a person might see, as the field of view is too small, and a patient wearing these type of VR goggles may experience motion sickness versus real world vision, due to blur, whirr, and latency.

Virtual image display has advantages for augmented reality (AR) presentation, including providing the capability for display of image content using a compact optical system that can be mounted on eyeglasses or goggles, generally positioned very close to the eye (Near-Eye Display) and allowing see-through vision, not obstructing the view of the outside world. Among virtual image display solutions for AR viewing are catadioptric optics that employ a partially transmissive curved mirror for directing image-bearing light to the viewer's eye and a partially reflective beam splitter for combining light generated at a 2D display with the real-world visible scene which forms a 3D image when viewed binocularly.

Vision correction applications have employed wearable display devices in order to enhance or compensate for loss of vision over portions of a subject's field of view (FOV). Support for these types of applications can require additional components and can introduce various factors related to wearability and usability that contribute to the overall complexity of the optical design and packaging.

Among challenges that must be addressed with wearable AR devices is obtaining sufficient brightness of the virtual image. The brightness may come from an image generator such as a Micro-OLED microdisplay (Self-luminous), LCOS (Reflective LCD), LCD (Transmissive LCD), or Micro-LED (Self-luminous) types of displays. Alternatively, Digital Light Processing (DLP) technologies may be used, or Laser Beam Splitting (LBS) techniques may be used. These may employ the techniques of Tunable-Polychromatic LEDs, Chip-first active-matrix micro LED displays using low temperature OTFT backplanes, or High PPI microLED displays with QD colour conversion.

Many types of AR systems, particularly those using pupil expansion, have reduced brightness and power efficiency. Measured in NITS or candelas per square meter (Cd/m2), brightness for the augmented imaging channel must be sufficient for visibility under some demanding conditions, such as visible when overlaid against a bright outdoor scene. Other optical shortcomings of typical AR display solutions include distortion, reduced see-through transmission, small eye box, and angular field of view (FOV) constraints.

Some types of AR solution employ pupil expansion as a technique for enlarging the viewer eye-box. However, pupil expansion techniques tend to overfill the viewer pupil which wastes light, providing reduced brightness, compromised resolution, and lower overall image quality.

Challenging physical and dimensional constraints with wearable AR apparatus include limits on component size, circuit board size, and positioning and, with many types of optical systems, the practical requirement for folding the optical path in order that the imaging system components be ergonomically disposed, unobtrusive, and aesthetically acceptable in appearance. Among aesthetic aspects, compactness is desirable, with larger horizontal than vertical dimensions.

Other practical considerations relate to positioning of the display components themselves. Organic Light-Emitting Diode (OLED) displays have a number of advantages for brightness and overall image quality, but can generate perceptible amounts of heat, which may have to be exhausted or minimized with heat sinks. For this reason, it is advisable to provide some distance and air space between an OLED display and the skin, particularly since it may be necessary to position these devices near the viewer's forehead or temples.

It has proved challenging to wearable display designers to provide the needed image quality, while at the same time allowing the wearable display device to be comfortable and aesthetically pleasing and to allow maximum see-through and peripheral visibility, which distinguishes the model from virtual reality (VR). In addition, the design of system optics must allow wearer comfort in social situations, without awkward appearance that might discourage use in public. Providing suitable component housing for wearable eyeglass display devices has proved to be a challenge, making some compromises necessary. As noted previously, in order to meet ergonomic and other practical requirements, some folding of the optical path along one or both vertical and horizontal axes may be desirable.

The present invention solves one or more of the problems identified above.

SUMMARY OF INVENTION

In one aspect of the present invention, an extended reality (XR) system is provided. The XR system includes a headset adapted to be worn by a user, a camera coupled to the headset, a display system mounted to the headset for displaying a display screen including computer-generated images thereon, and a controller coupled to the camera and the display system. The controller includes one or more processors programmed to execute an algorithm for operating in an optical character recognition (OCR) mode and a scrolling text mode to display computer-generated images using the display system including the steps of operating in the OCR mode to display a text selection screen by: receiving video images from the camera, accessing a retinal map associated with the user identifying a non-viewable boundary defining an area of the user's field of vision associated with low vision, generating an image distortion zone within the text selection screen associated with the identified non-viewable boundary, modifying the received video images to adjust a viewable image attribute of a portion of the received video images displayed within the image distortion zone, displaying the modified video images on the text selection screen, and selecting text images displayed within the modified video images. The one or more processors also execute the algorithm including operating in the scrolling text mode to display a text display screen by: generating machine-readable text of the selected text images using optical character recognition (OCR), modifying the generating machine-readable text using a lightweight language model for text correction, and displaying the modified generated machine-readable text as an animated line of text scrolling across the text display screen.

In another aspect of the present invention, a method of operating an extended reality (XR) system is provided. The XR system includes a headset adapted to be worn by a user, a camera coupled to the headset, a display system mounted to the headset for displaying a display screen including computer-generated images thereon, and a controller including one or more processors coupled to the camera and the display system. The method includes the one or more processors performing an algorithm for operating in an optical character recognition (OCR) mode and a scrolling text mode to display computer-generated images using the display system including the steps of operating in the OCR mode to display a text selection screen by: receiving video images from the camera, accessing a retinal map associated with the user identifying a non-viewable boundary defining an area of the user's field of vision associated with low vision, generating an image distortion zone within the text selection screen associated with the identified non-viewable boundary, modifying the received video images to adjust a viewable image attribute of a portion of the received video images displayed within the image distortion zone, displaying the modified video images on the text selection screen, and selecting text images displayed within the modified video images. The one or more processors also perform the algorithm including the steps of operating in the scrolling text mode to display a text display screen by: generating machine-readable text of the selected text images using optical character recognition (OCR), modifying the generating machine-readable text using a lightweight language model for text correction, and displaying the modified generated machine-readable text as an animated line of text scrolling across the text display screen.

In yet another aspect of the present invention, a non-transitory computer-readable storage media having computer-executable instructions embodied thereon to operate an extended reality (XR) system is provided. The XR system includes a headset adapted to be worn by a user, a camera coupled to the headset, a display system mounted to the headset for displaying a display screen including computer-generated images thereon, and a controller including one or more processors coupled to the camera and the display system. When executed by the one or more processors the computer-executable instructions cause the one or more processors to perform an algorithm for operating in an optical character recognition (OCR) mode and a scrolling text mode to display computer-generated images using the display system including the steps of operating in the OCR mode to display a text selection screen by: receiving video images from the camera, accessing a retinal map associated with the user identifying a non-viewable boundary defining an area of the user's field of vision associated with low vision, generating an image distortion zone within the text selection screen associated with the identified non-viewable boundary, modifying the received video images to adjust a viewable image attribute of a portion of the received video images displayed within the image distortion zone, displaying the modified video images on the text selection screen, and selecting text images displayed within the modified video images. The one or more processors also perform the algorithm including the steps of operating in the scrolling text mode to display a text display screen by: generating machine-readable text of the selected text images using optical character recognition (OCR), modifying the generating machine-readable text using a lightweight language model for text correction, and displaying the modified generated machine-readable text as an animated line of text scrolling across the text display screen.

BRIEF DESCRIPTION OF THE DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Corresponding reference characters indicate corresponding parts throughout the drawings.

DETAILED DESCRIPTION

Figures 1, 2:
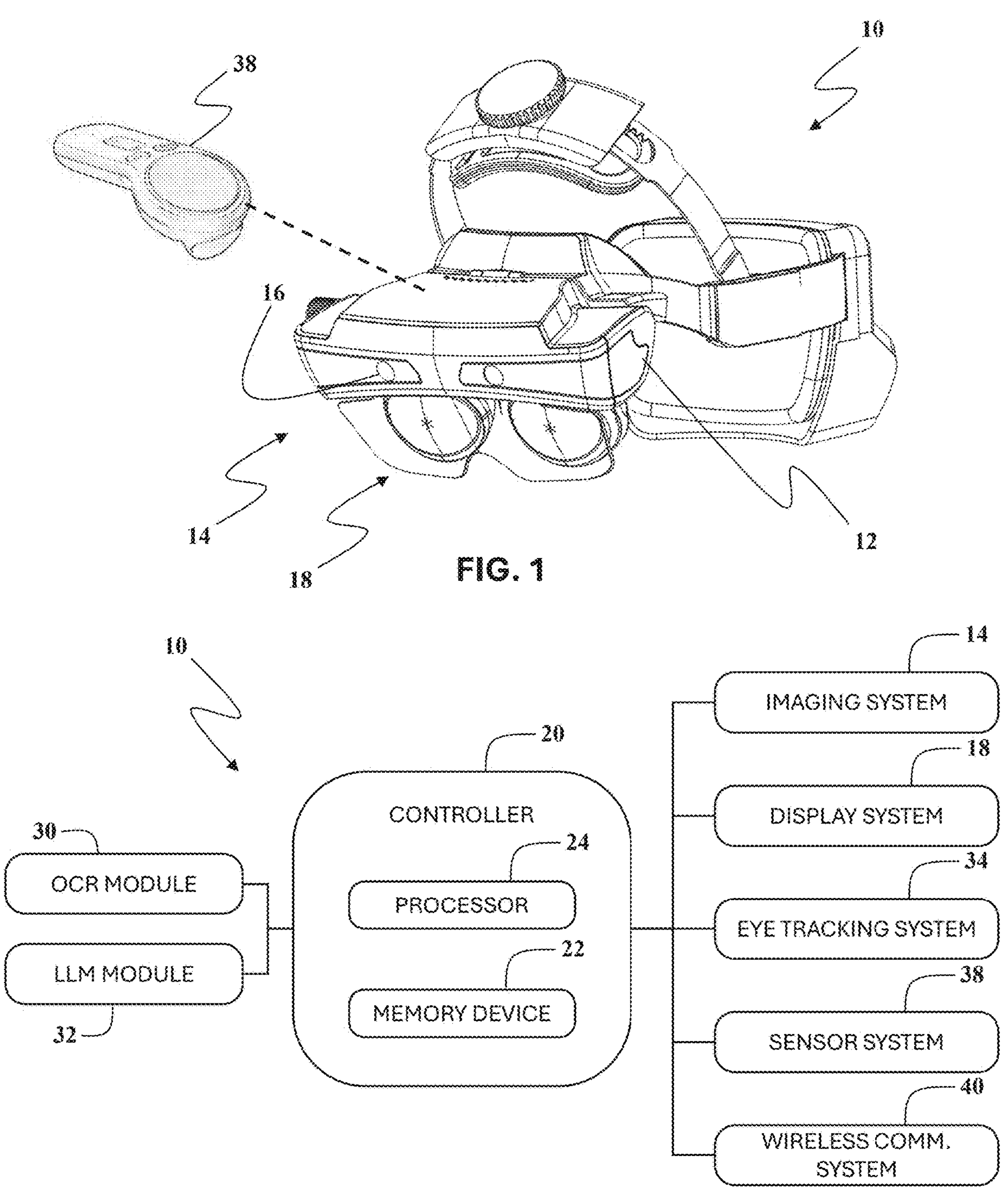
FIG. 1 is a perspective view of an extended reality (XR) system, according to embodiments of the present invention.
FIG. 2 is a functional block diagram of the XR system in FIG. 1.

With reference to the figures, and in operation, the present invention is directed towards an extended reality (XR) system that includes a controller programmed to perform an algorithm including an artificial intelligence assisted (AI-assisted) image capture optical character recognition (OCR) for use with visual aid correction for users with low vision, such as damaged areas that result with macular degeneration or macular hole. The following is a detailed description of the preferred embodiments of the disclosure, reference being made to the figures in which the same reference numerals identify the same elements of structure in each of the several figures.

Referring to FIGS. 1-2, in the illustrated embodiment, the XR system 10 includes a headset 12 adapted to be worn by a user, an imaging system 14 including one or more cameras 16 coupled to the headset 12, a display system 18 mounted to the headset for displaying a display screen including computer-generated images thereon, and a controller 20 coupled to the imaging system 14 and the display system 18. In the illustrated embodiment, the controller 20 includes a memory device 22 for storing computer-executable instructions thereon, and one or more processors 24 programmed to execute the computer-executable instructions to perform algorithms for operating in an optical character recognition (OCR) mode 26 (shown in FIGS. 5-11) and a scrolling text mode 28 (shown in FIGS. 12-14) to display computer-generated images using the display system 18 to assist users experiencing low vision.

In the illustrated embodiment, the controller 20 may also include an OCR software module 30 including computer-executable instructions for use in generating machine-readable text using optical character recognition (OCR), and a lightweight language software model 32 including computer-executable instructions for use in performing text correction on the generated machine-readable text. In some embodiments, the XR system 10 may also include an eye tracking system 34 mounted to the headset 12 for use in tracking the user's eye movement and determining position of the user's gaze, a sensor system 36 mounted to the headset 12 for determining a position and/or movement of the user's head and/or the headset 12, and a wireless hand-held remote 38 that wirelessly communicates with the controller 20 via a wireless communication system 40 such as, for example, cellular frequencies, Radio Frequencies, WiFi, Bluetooth or Bluetooth Low Energy, to enable a user to operate the XR system 10.

In reviewing how patients "see" with the pixel manipulation, we tested a new idea to help them grasp complex imaging and text such as is found in a magazine or newspaper. The point being that even with correction it can sometimes be difficult to determine where a block of text is and where it starts and ends, and where column breaks are. When a user cannot understand where these segregations are, they can make the mistake of continuing to try to read a specific column sentence, miss the column break or space, and then try to read the sentence in the next column, which leads to reduced understanding of the article. The same is true of segments found on the pages of newspapers or magazines, such as new lines or page breaks or other whitespace.

This "Scrolling" method for text, serves to alleviate the issues these low vision and/or AMD patients were having with next line reading. The method implements a rendering of text, either through a rendering of glyph data in a graphics language to be rendered with a graphics processing unit (GPU), or by creating a canvas with the appropriate text in the appropriate space. This rendering is offset linearly with regard to time. The time and offset correlation is what the user will perceive as "scrolling".

The scrolling can then be increased in speed by moving the text at a greater distance between renderings. The rendering occurs at the speed of the refresh rate of the display.

One embodiment would be that given the refresh rate of the headset cameras and displays are set at a suggested 90 hz, (but can be higher or lower). The text width can be set in the headset at 40 pixels. And, given the average word length in English is 5.1 characters, and given the space between a word is 1 character, therefore the XR system 10 would need to move 244 pixels for each word. Fluent reading proficiency is around 250 wpm, meaning the XR system 10 would need to move 244*250 (61000) pixels per minute, or 1016.67 pixels per second. This is a formula of $Ps=((5.1+1)*40)*250)/60$ and $FWps=Ps/90$.

There is also a need for Image Recognition OCR to use a smoothing algorithm to ensure that detached paragraphs, or paragraphs on separate pages, can be combined to form a coherent line of text for the subject to read. This algorithm combines detected lines contextually, so that what is formed into a single line to stream or scan back to the user is coherent.

One aspect of the present invention is the permit the user to accomplish the Image Recognition by a wireless handheld remote 38 which operates some of the Headset features and apps to "snap" a picture of the entire page, which is then run through an optical character recognition model controller 20, which image or video can then be sorted by the Artificial Intelligence 32 in the XR headset or by algorithms in the software into distinct sections with words (text) and pictures.

In this instance "text" can be words, numbers, equations, or letters of any alphabet or pictographs, or any other text which communicates an idea like letter and numbers do.

The pictures and texts can be separated by the Image Capture and Recognition engine 30 in the headset, for different viewing.

The user has options via a control mechanism included in or connected to the headset either wire or wirelessly.

These regarding the text or words or number, can then be displayed electronically, so that the text, words and/or numbers are streamed by the user's eye in a digital (virtual) not real reality format. In this instance the user can use voice command and/or the hand-held controller, or other means of control in order to magnify the words, text, or numbers use enhancement techniques on them and have the ability to speed up or slow down the rate at which the test is digitally scrolled in front of the user's good retina in the headset by using the pixel manipulation identified herein. Also, the user can use the XR system 10 to look at either the scrolling text, words or numbers, or look at the images or video with the text independently and separately from the text.

So, the use can choose to see either the pictures in each of the segments or the text and words in each of the segments. A user would be shown, by the headset software what the entire picture he/she snapped looks like and the user can magnify or zoom in on and choose one or more segments to further refine.

This could be also used because the user has an unsteady hand and wants to take a picture of an item like a price tag or a can of "green beans" for example whereby the user could snap the picture, the headset would automatically use optical character recognition to turn the image or video where the image of video is now steadied by being digitized and in the headset software, then it can be magnified or zoomed in to instantly review or better read or understand in the information. Other techniques like enhancing the image, contrast, color or reversing the foreground and text colors can be used. The image itself can be zoomed in and magnified.

If a user wants to read the words in the segments or columns then the user has the option through voice command or the hand-held controller to convert the live image to a digital image which has been through an image recognition processing as described above.

In the illustrated embodiment, the XR system 10 includes a multi-platform visual aid system for vision correction and text processing, specifically designed to assist users with visual impairments including, but not limited to, macular degeneration.

The XR system 10 comprises multiple device implementations including augmented reality (AR) headsets, virtual reality (VR) headsets, heads-up displays, smartphones, and digital display systems, such as personal computers, each optimized for its specific platform while maintaining core functionality.

In operation, the XR system 10 implements vision correction algorithms and image processing across all supported platforms. Cross-device synchronization enables seamless transition among different devices while maintaining user preferences and settings.

The XR system 10 incorporates an integrated optical character recognition (OCR) subsystem enhanced with an on-board lightweight language model (LLM) for real-time text correction and enhancement. Following initial OCR processing, the embedded LLM analyzes the extracted text to identify and correct potential OCR errors, including but not limited to character misidentification, word spacing issues, and syntactic anomalies. The LLM operates within device memory constraints while maintaining processing efficiency, utilizing compressed model architectures optimized for low-latency inference. The error correction system implements both context-aware spelling correction and grammatical structure analysis, providing automatic suggestions for text enhancement while preserving the original meaning and formatting intentions of the source material.

The XR system 10 may implement both single-line and multi-line reading modes. In the single-line mode, text scrolls horizontally at a user-defined or system-controlled speed, calculated using the formula Ps=((5.1+1)*40)*250)/60, where Ps represents pixels per second movement. In one embodiment, The system can automatically adjust scrolling speeds based on reading comprehension patterns. The standard scroll rate is calculated based on fluent reading proficiency averaging 250 words per minute (wpm), resulting in 1016.67 pixels per second.

In one embodiment, the XR system 10 can detect reading speed variations through eye tracking or manual input and adjust accordingly. In one embodiment, the automated adjustment system monitors reading patterns and can modify speeds in real-time to match user comprehension and comfort levels, while maintaining smooth text movement through frame-rate synchronized updates at 60 Hz or higher depending on display capabilities.

One embodiment would be that given the refresh rate of the headset cameras and displays are set at a suggested 90 hz, (but can be higher or lower). The text width can be set in the headset at 40 pixels. And, given the average word length in English is 5.1 characters, and given the space between a word is 1 character, therefore we would need to move 244 pixels for each word. Fluent reading proficiency is around 250 wpm. meaning we need to move 244*250 (61000) pixels per minute, or 1016.67 pixels per second. meaning This is a formula of Ps=((5.1+1)*40)*250)/60 and FWps=Ps/90.

In the multi-line reading mode, the system displays multiple lines simultaneously, with the focus line scrolling horizontally while preceding and following lines remain static to maintain peripheral awareness of position within the reading context. The number of visible context lines is user-configurable, ranging from 1 to a variable number of 5 lines above and below the focus line, determined by the text size and display pixel area. Line progression employs both automatic and manual control methods. In automatic mode, the system advances to the next line upon completion of the current line's horizontal scroll, with configurable line break delay periods that adjust based on punctuation, line breaks, or paragraph breaks.

The OCR and LLM processing pipeline maintains synchronization with the reading modes, ensuring that corrected text is available for display without introducing latency or disrupting the reading experience. The system implements efficient caching mechanisms to store processed and corrected text, reducing computational overhead during subsequent access to previously processed content.

Manual progression allows users to control reading position both horizontally, with the previously described scrolling methods, and vertically within the reading context through various input methods such as eye tracking movements, head tracking gestures, voice commands, physical controllers, touch controls, or traditional keyboard and mouse inputs where or when applicable. The transition between lines incorporates customizable animation patterns that simulate natural reading movements, including adjustable scanning motions, smooth vertical transitions, and variable speed ramping. These animations can be fine-tuned to match individual reading patterns and preferences, enhancing the natural feel of the reading experience. The transition between lines maintains smooth visual flow while preserving the contextual relationship of surrounding text. Each new focus line begins its scroll movement once selected, while previously read lines remain visible but static, providing continuity of context for the reader.

The XR system 10 processes various digital content formats including e-books including but not limited to EPUB, MOBI, AZW, PDFs, emails, web content, and standard document files including but not limited to DOC, DOCX, RTF, TXT, ODF. Content processing includes intelligent format preservation, maintaining crucial elements such as headlines, lists, tables, and footnotes while optimizing the presentation for the user's specific visual needs. The OCR and LLM subsystem maintains format awareness, ensuring that structural elements and formatting are preserved during the error correction process.

Input methods vary by platform but universally include combinations of eye tracking, head tracking, touch controls, voice commands, and other input devices. Eye tracking enables gaze-based selection and reading speed adaptation or directional control, while head tracking can provide directional control and gesture recognition.

Platform-specific implementations may include additional features based on available hardware capabilities and limitations. When implemented on AR/VR headsets, the system may include immersive text display with real-world integration, stereoscopic display optimization and environmental lighting adaptation. For heads-up displays, the system can implement transparent overlays with minimal interfaces, which may include adaptive transparency and context-aware positioning. Smartphone implementations can utilize touch-optimized interfaces and split-screen capabilities, while display systems may integrate with other environments including but not limited to computers and provide multiple monitor support. These platform-specific features are optional and modular, allowing the core system functionality to operate independently of advanced hardware capabilities.

The XR system 10 may implement automated features for an enhanced user experience. These features could include speed adaptation based on reading patterns, context awareness for content type, environmental adjustment for lighting conditions, user preference learning, fatigue detection, comprehensive progress tracking across all platforms and devices, and customizable user notifications, such as reading break suggestions. Such automated features are optional and can be implemented based on hardware capabilities and user preferences.

Processing optimization ensures efficient system operation through real-time display adjustments, input processing, image enhancement, content rendering, and text correction. The system implements battery life optimization strategies and maintains seamless cross-device synchronization for user preferences and reading progress. The on-board LLM utilizes efficient model compression techniques and selective processing to minimize power consumption while maintaining correction accuracy.

Figure 3:
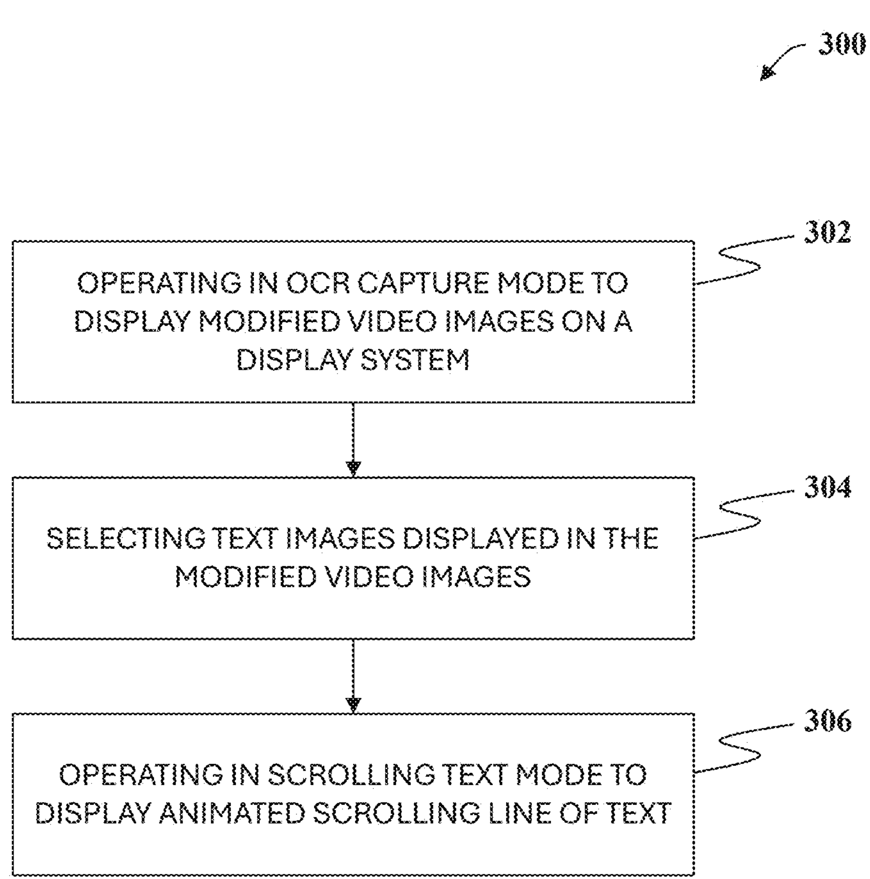
FIGS. 3 and 4 are flow charts illustrating algorithms used during operation of the XR system for operating in an optical character recognition (OCR) mode and a scrolling text mode to display computer-generated images.
Figure 4:
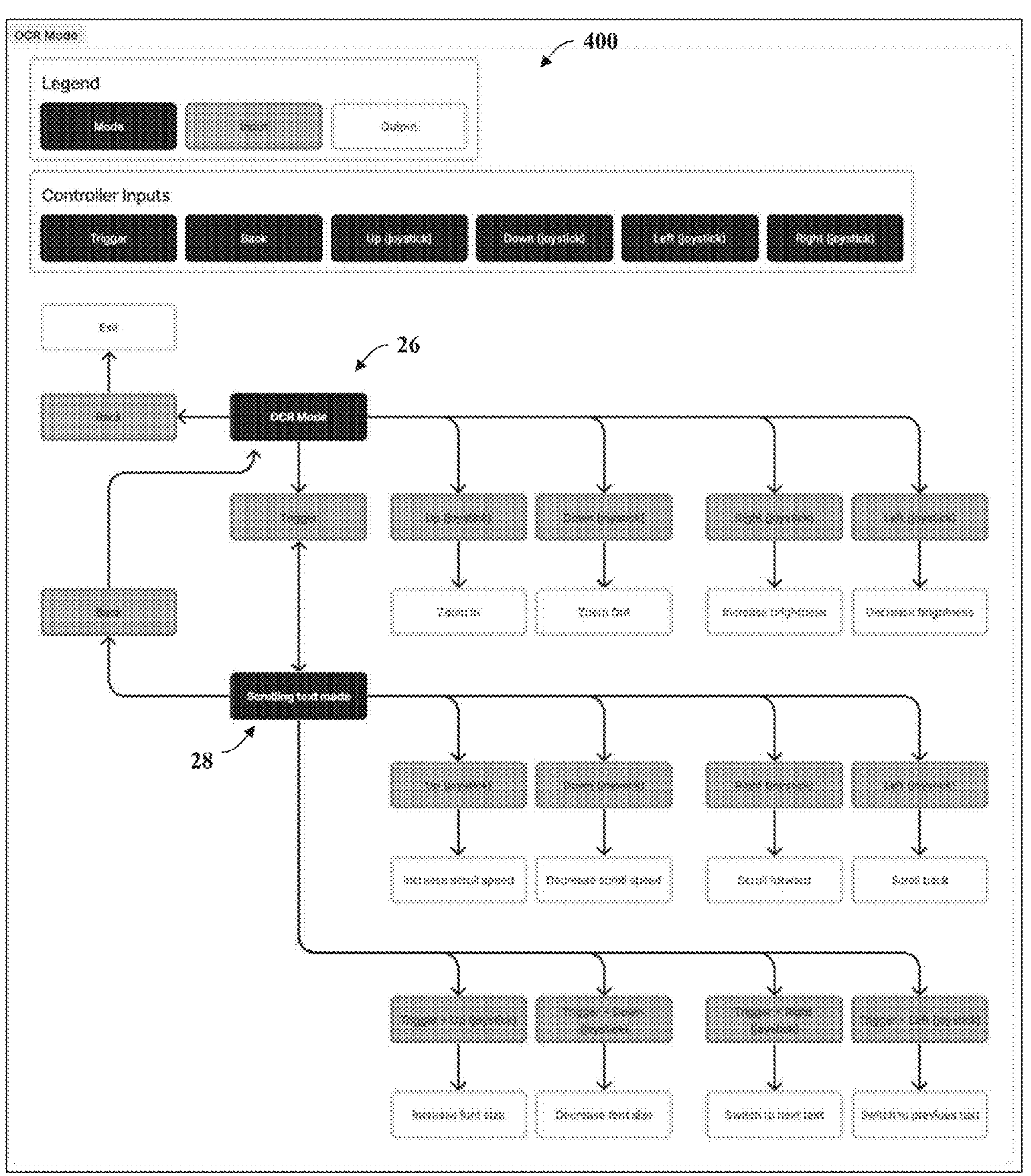
Figure 5:
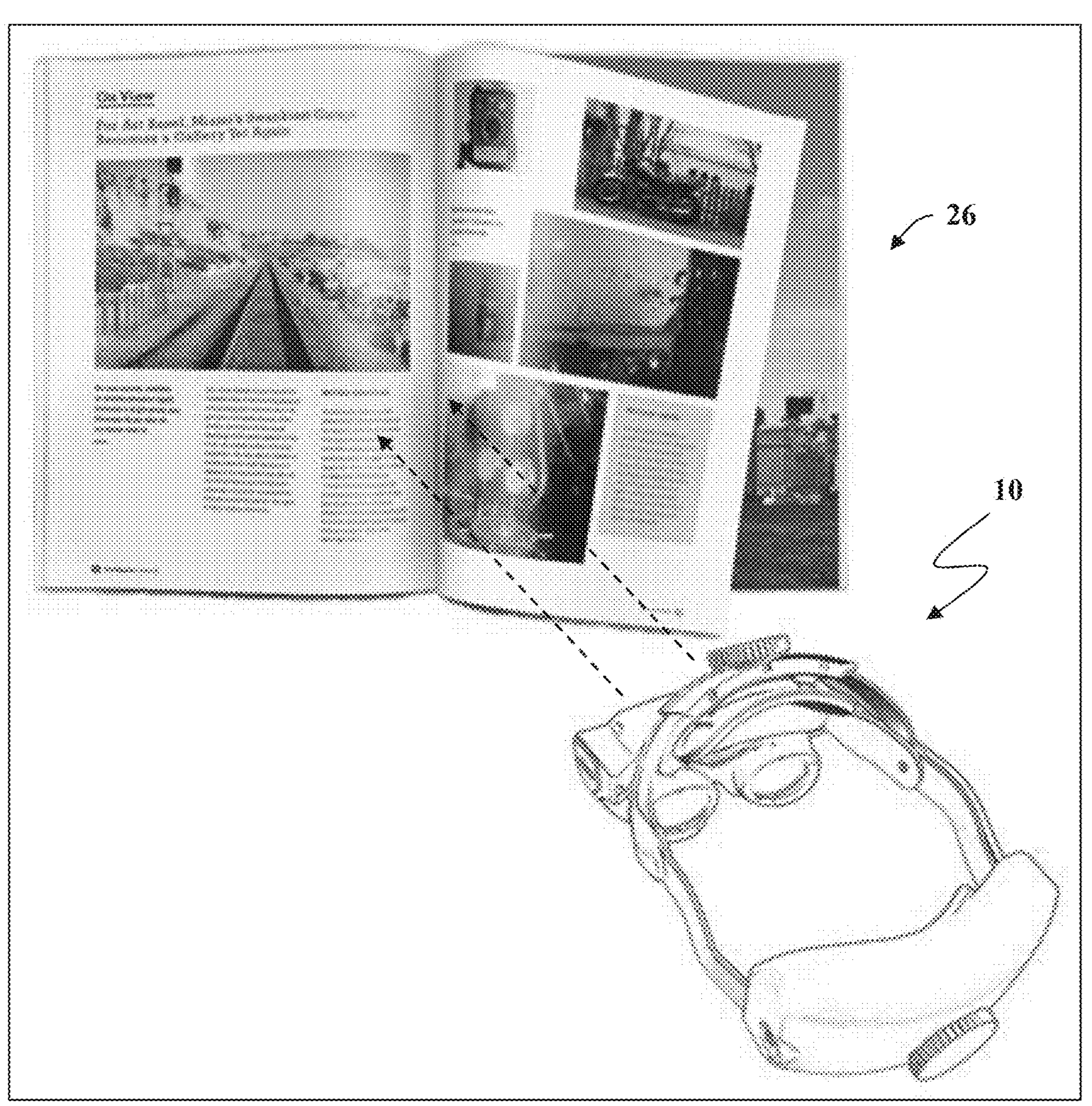
FIG. 5 is a perspective view of the XR system operating in the (OCR) mode.
Figure 6:
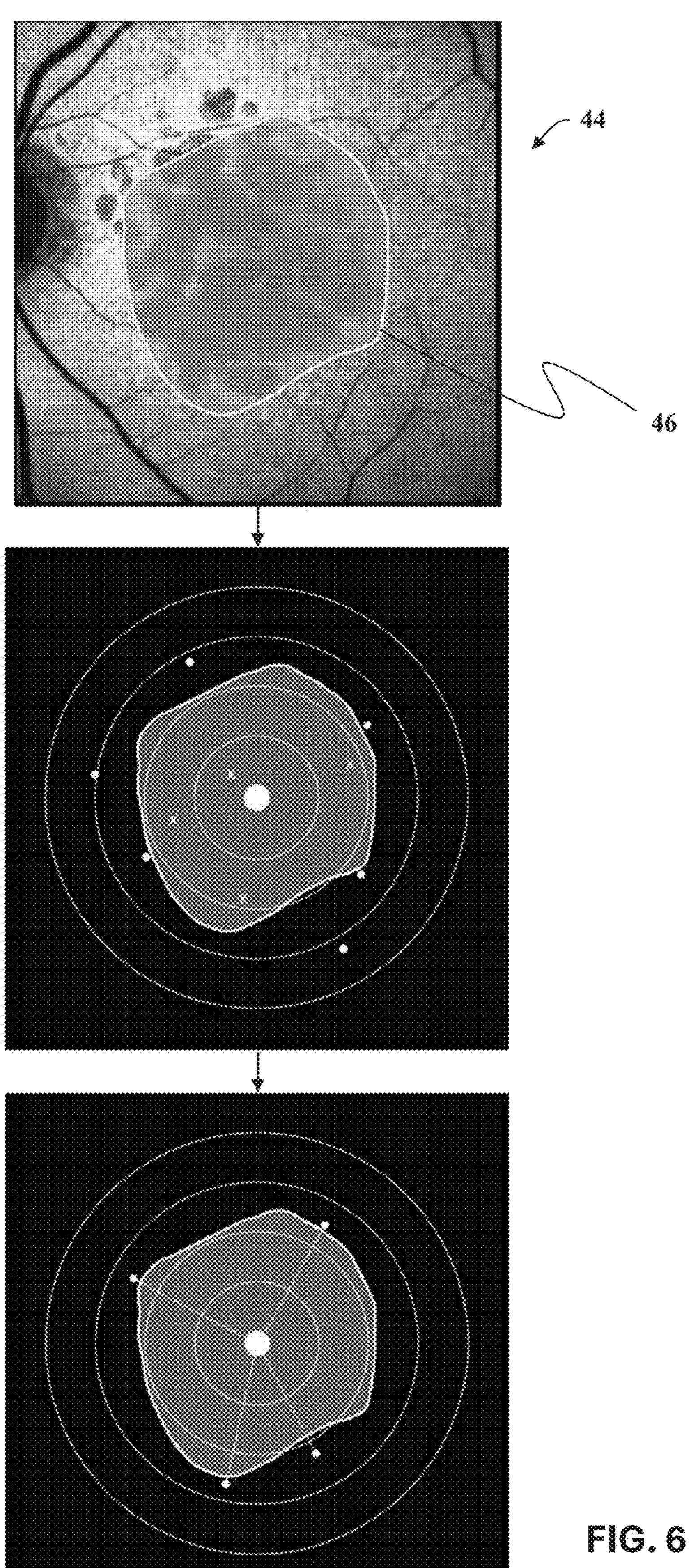
FIGS. 6-14 are exemplary illustrations of display screens illustrating the algorithms shown in FIGS. 3 and 4.

FIGS. 3 and 4 are flow charts illustrating algorithms 300 and 400 executed by the one or more processors 24 for operating the XR system 10 in the OCR mode 26 (shown in FIGS. 5-11) and the scrolling text mode 28 (shown in FIGS. 12-14) to display computer-generated images to the user using the display system 18. The algorithms 300 and 400 include a plurality of steps. Each algorithm step may be performed independently of, or in combination with, other algorithm steps. Portions of the algorithms may be performed by any one of, or any combination of, the components of the XR system 10.

Figure 10:
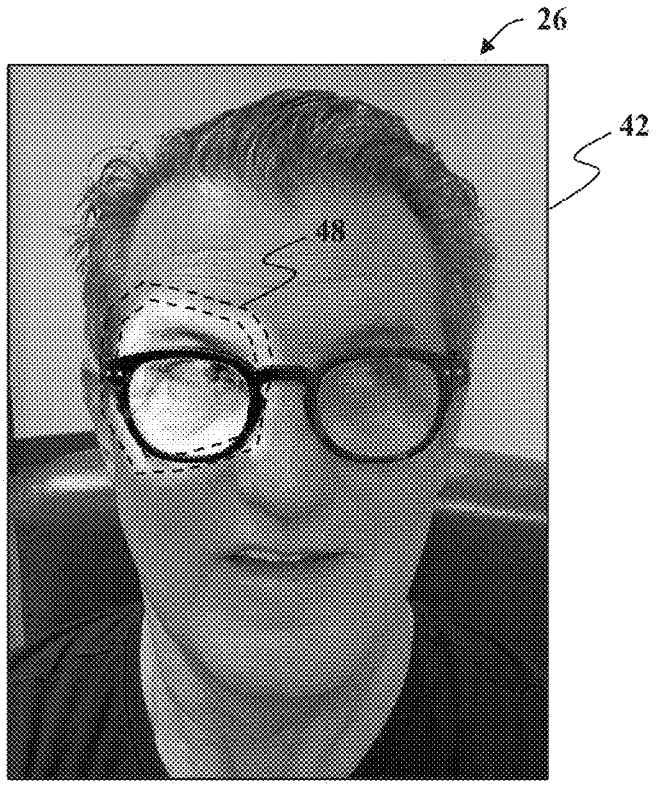

In the illustrated embodiment, in algorithm step 302, the one or more processors 24 operate in the OCR mode 26 to display a text selection screen 42 on the display system 18 by receiving video images from the imaging system 14, accessing a retinal map 44 (shown in FIG. 6) associated with the user identifying a non-viewable boundary 46 defining an area of the user's field of vision associated with low vision, and generating an image distortion zone 48 within the text selection screen 42 associated with the identified non-viewable boundary 46. The processor 24 then modifies the received video images to adjust a viewable image attribute of a portion of the received video images displayed within the image distortion zone 48 and displays the modified video images on the text selection screen 42. The processor 24 may also operate in the OCR mode 26 by increasing a scale factor to adjust the viewable image attribute of a portion of the received video images displayed within the image distortion zone 48 such that video images appearing in the image distortion zone 48 appear larger than surrounding video images. In other embodiments, the processor 24 may adjust a brightness and/or contrast of the video images appearing within the image distortion zone 48 (as shown in FIG. 10).

Figure 7:
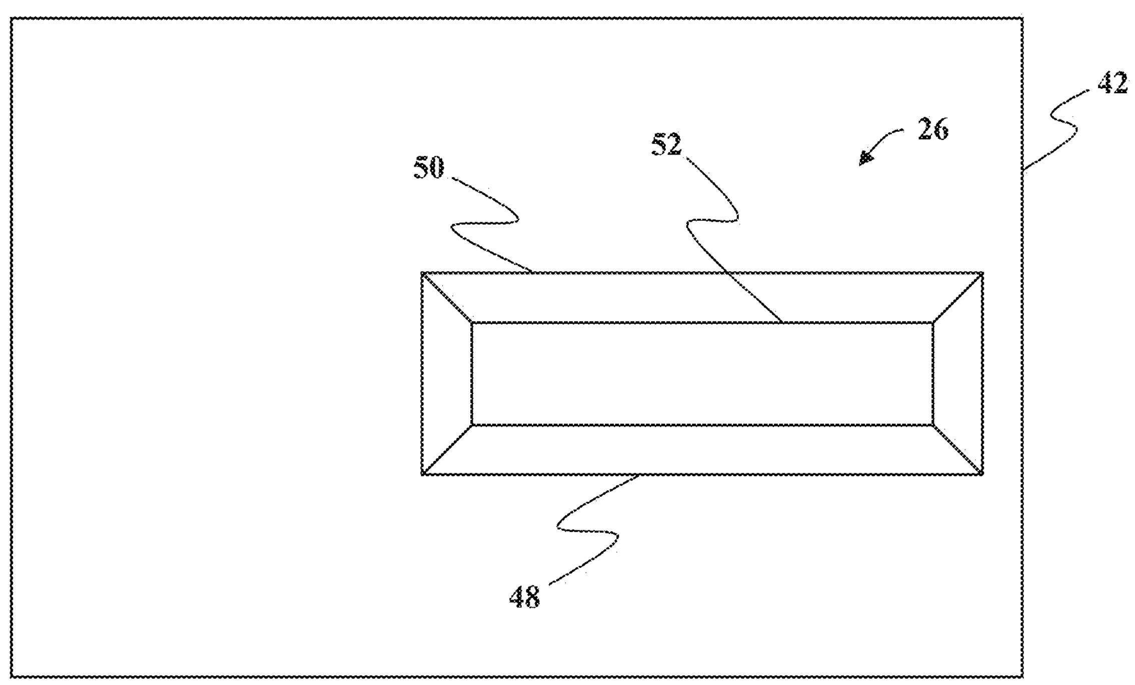
Figure 8A:
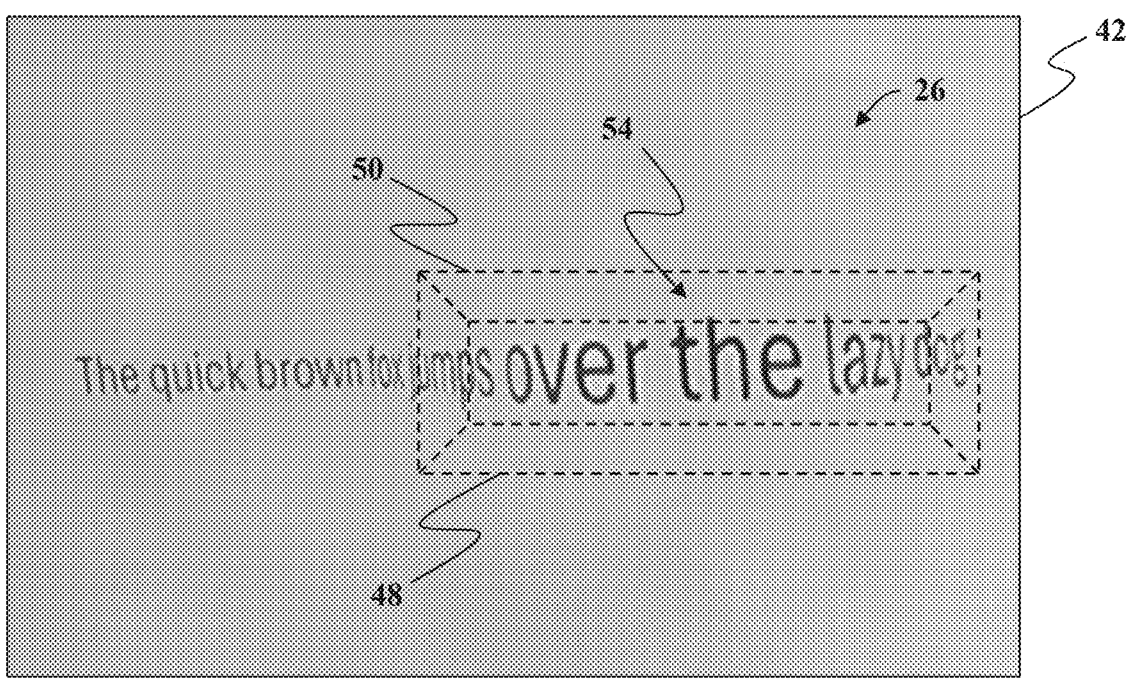
Figure 8B:
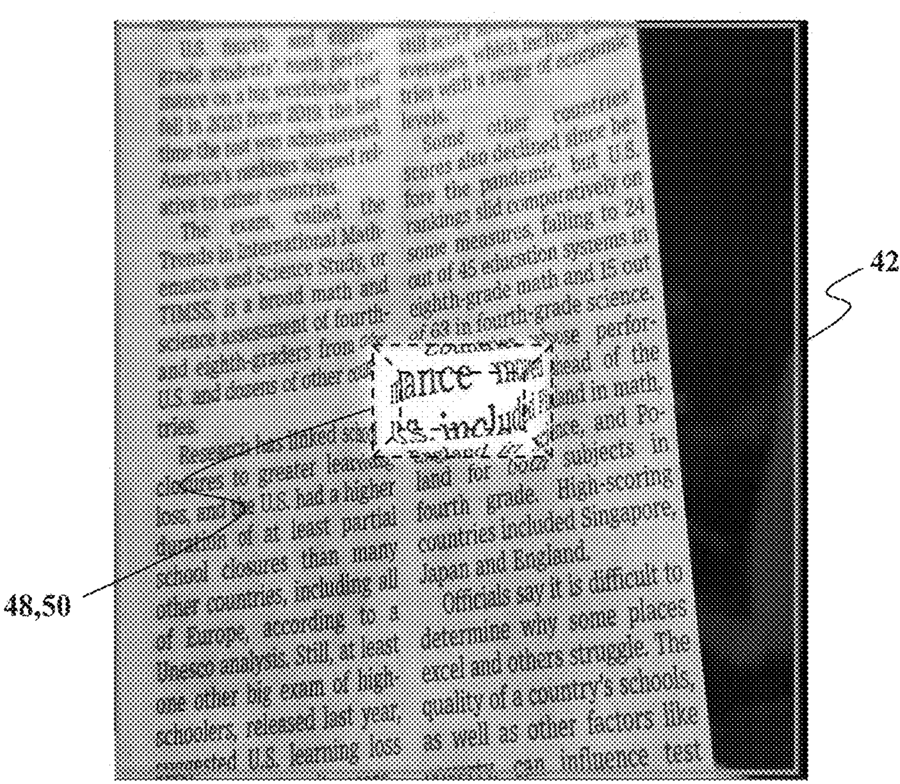
Figure 8C:
Figure 9:
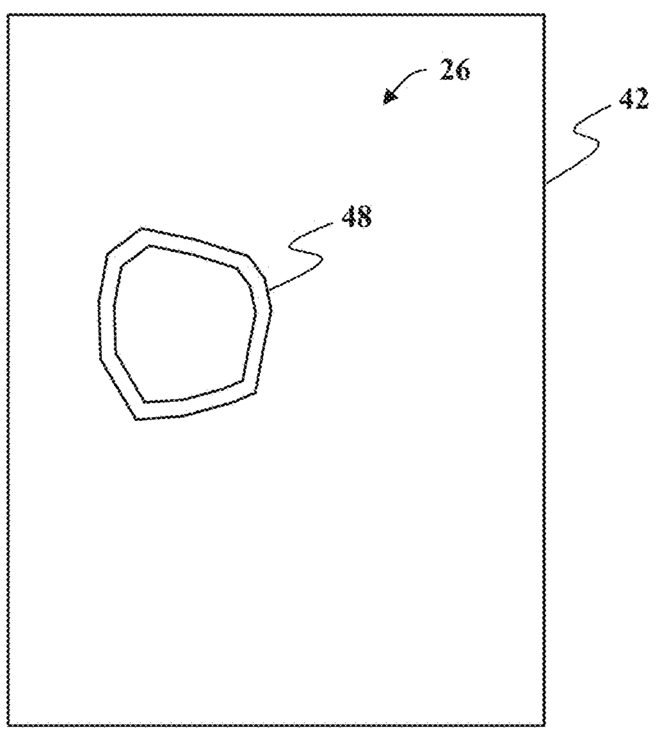

For example, as shown in FIGS. 7-10, in some embodiments the processor 24 generates the image distortion zone 48 within the text selection screen 42 by identifying a pixel location on an area of the text selection screen 42 that corresponds to the non-viewable boundary 46 of the user and mapping the image distortion zone 48 as a 3-dimensional (3-D) object 50 onto the identified corresponding pixel location. For example, as shown in FIGS. 7-8, the image distortion zone 48 may be generated as a 3-D frustum 50 having an upper plateau region 52. The processor 24 then increases a scaling factor of video images appearing across the 3-D frustum 50 such that video images displayed across the upper plateau appear larger to the user than the surrounding video images. In other embodiments, the image distortion zone 48 may also be generated as other 3-D shapes such as a sphere, and/or 2-dimensional (2-D) shapes such as a rectangle, a circle, and/or a 2-D shape having a non-uniform boundary (shown in FIGS. 9-10). In some embodiments, the processor 24 may operating in the OCR mode by receiving a tracked location of the user's gaze from an eye tracking system 34 and adjusting a location of the image distortion zone 48 within the text selection screen 42 based on the tracked location of the user's gaze.

In other embodiments, the processor 24 may access the retinal map 44 associated with the user and establish at least one boundary as a function of data associated with the retinal map 44 indicative of an area to be corrected within the user's vision. The processor 24 then receives an image from the camera 16 and applies corrections to the received image based on the retinal map 44 to generate a corrected image. For example, the processor 24 may apply corrections to the image by shifting image data located within the boundary outward along a plurality of rays starting at a center point to outside the boundary such that the image data from the center point to an edge of the image is compressed in the corrected image from the boundary to the edge of the image. Additional details of retinal maps 44 and image distortion zones 48, which may be used in the present invention, are described in U.S. patent application Ser. No. 15/073,144 to Richard Freeman et al., filed Mar. 17, 2016, titled "System, Method, and Non-Transitory Computer-Readable Storage Media Related to Correction of Vision Defects Using a Visual Display", which is incorporated herein by reference in its entirety.

Figure 11:

In algorithm step 304, the processor 24 selects text images displayed within the modified video images for use in generating machine-readable text via OCR. For example, as shown in FIG. 11, the processor 24 may operate in the OCR mode by identifying text images 54 displayed within the image distortion zone 48 and displaying user-selectable text identifiers 56 around portions of the identified text images 54. The processor 24 may display the user-selectable text identifiers 56 as a bold outline image around the identified text images 54 to enable the user to select the identified text images 54. The user may then operate the wireless hand-held remote 38 to select the text images displayed within the modified video images via the user-selectable text identifiers 56.

Figure 12:
Figure 13:
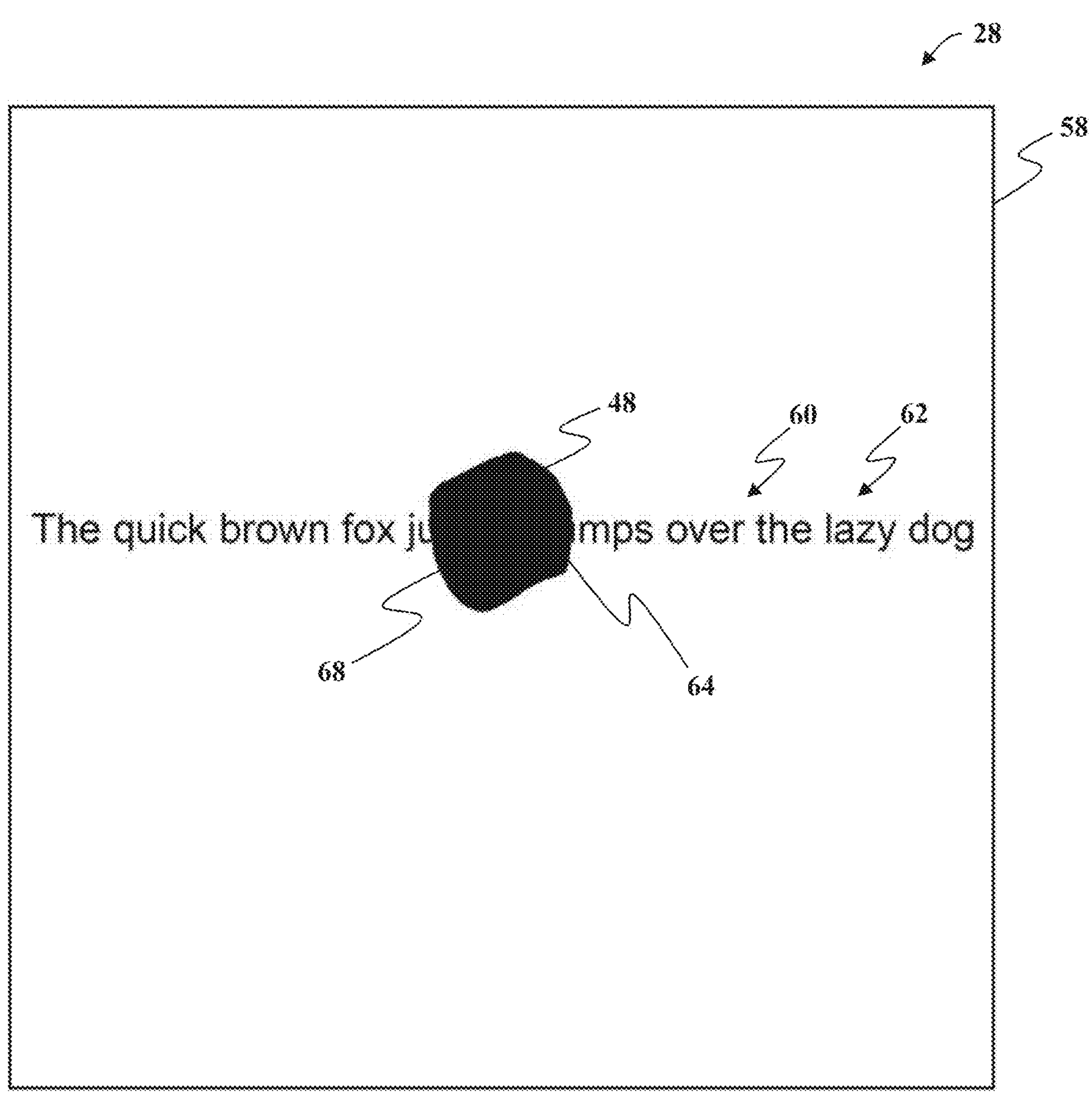

As shown in FIGS. 11-13, in OCR mode 26 the XR system 10 may capture blocks of text with the camera 16, and using neural nets, or basic shape recognition in computer vision, determine a text value to the image block. One problem when implementing this method with the scrolling text function is that these blocks do not have any contextual relationship. The text from the subtitle of the article, the by-line, and the text columns of the article are all treated by traditional OCR as separate blocks. By using contextual smoothing algorithms, and also leveraging simple LLM, and other neural networks, these blocks and lines can be combined to show a cohesive single line representation of the entire piece (shown in FIG. 13). When a user is able to then have that line of text fed into the scrolling text renderer, the whole, complete, contextual information is available.

In some embodiments, the processor 24 operates in OCR mode 26 to identify distinct bodies of text and highlights them for the user. Text closest to the center of the screen and/or the image distortion zone 48, may be highlighted in bold and can be selected by the user to bring into scrolling text mode.

Selected text is enhanced and converted into a single scrolling line for the user to easily read. Note that the scrolling text adapts to the user's blind spot. The user can also make adjustments to the font size, scroll speed, contrast etc. to further improve their reading experience. After completion, the user can switch to the next body of text or exit back into OCR mode.

In algorithm step 306, the processor 24 operates in the scrolling text mode 28 to display a text display screen 58 (shown in FIGS. 12-14) by generating machine-readable text of the selected text images using optical character recognition (OCR), modifying the generating machine-readable text using a lightweight language model for text correction, and displaying the modified generated machine-readable text as an animated line of text 60 scrolling across the text display screen 58. For example, the processor 24 may operate in the scrolling text mode 28 by animating the modified generated machine-readable text as a single line of text 62 scrolling across the text display screen 58 from left to right. As shown in FIGS. 12-13, the processor 24 may also operate in the scrolling text mode 28 by displaying the text display screen 58 including the image distortion zone 48 and animating the single line of text 62 scrolling across the text display screen 58 such that letters appearing adjacent a first edge 64 of the image distortion zone 48 sequentially appear at a second edge 66 of the image distortion zone 48 as the single line of text 62 scrolls across the text display screen 58 from left to right.

Figure 14:
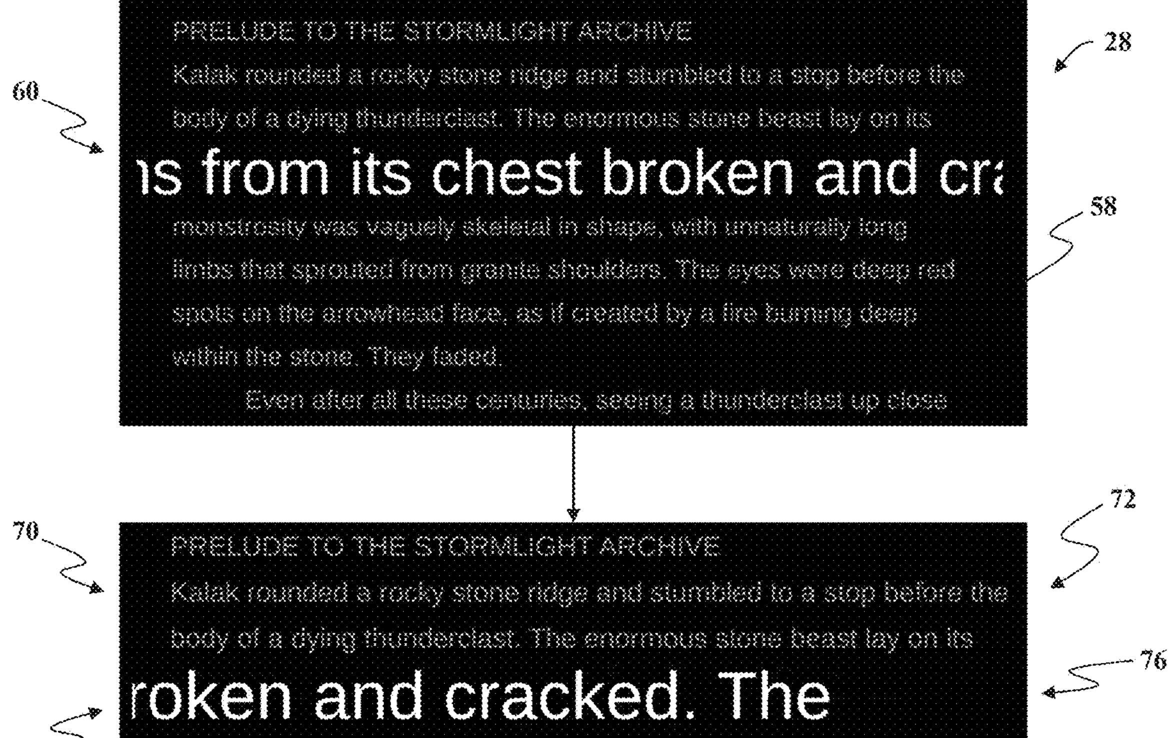
Figure 15:
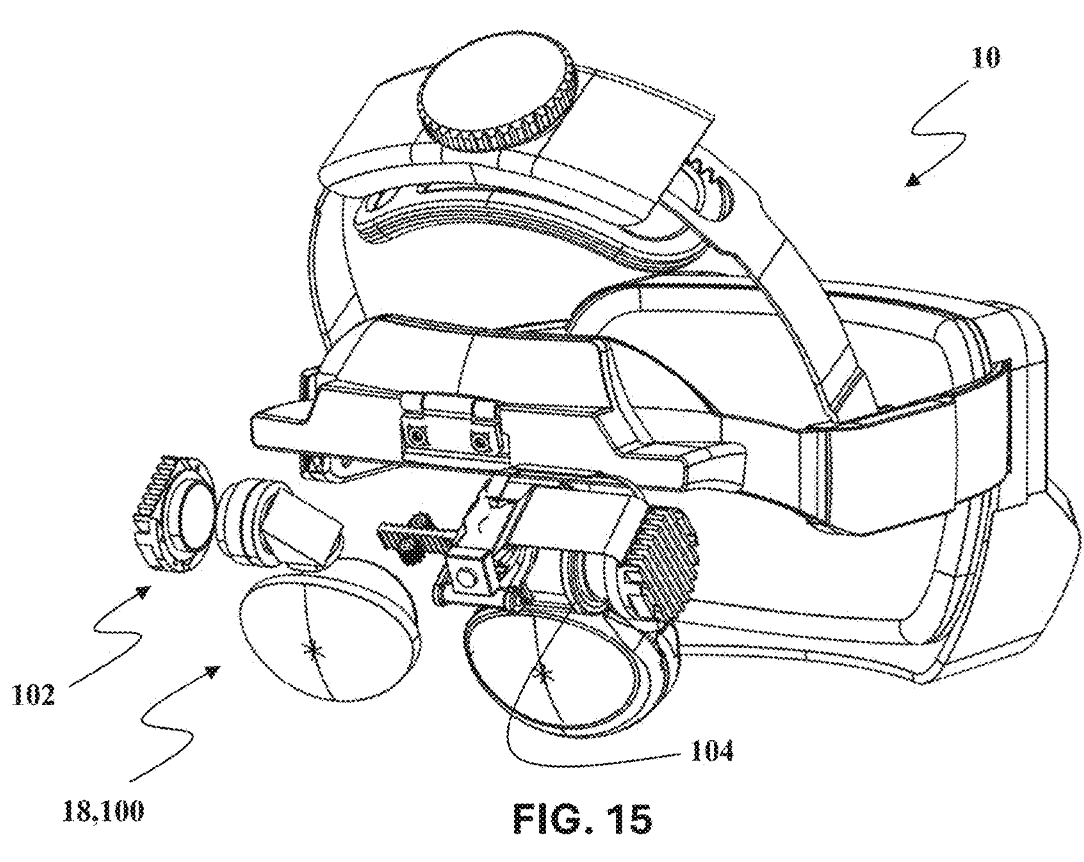
FIGS. 15-31 are schematic views of display systems that may be used with the XR system shown in FIG. 1, according to embodiments of the present invention.
Figure 16:
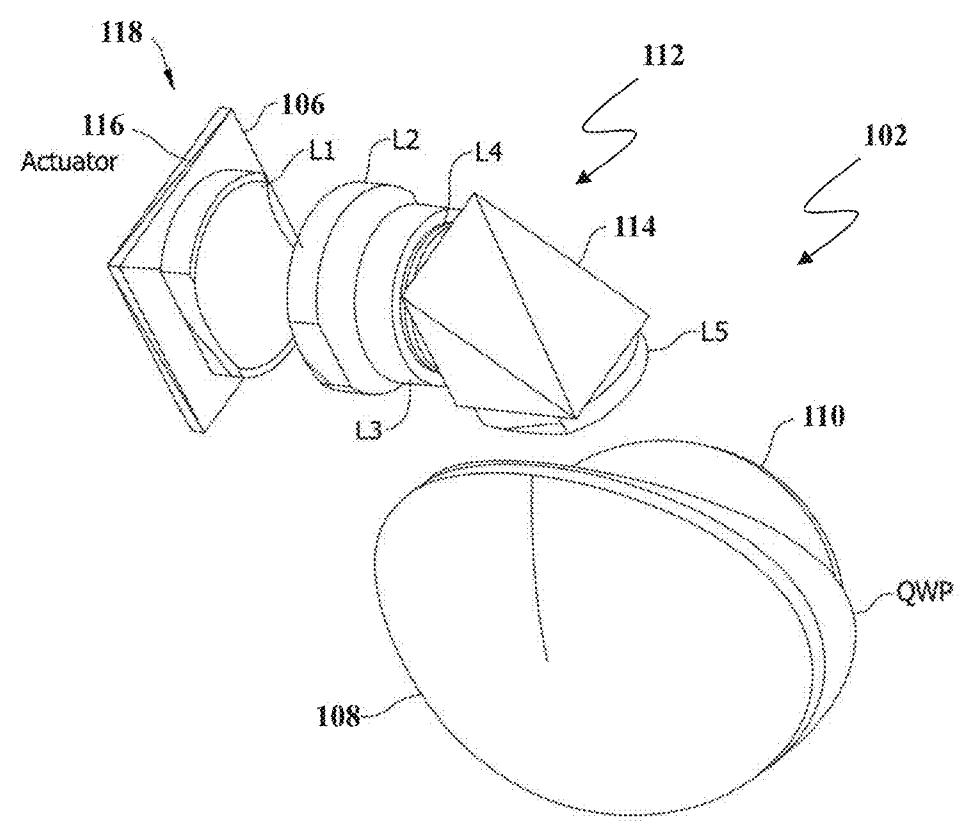
Figure 17:
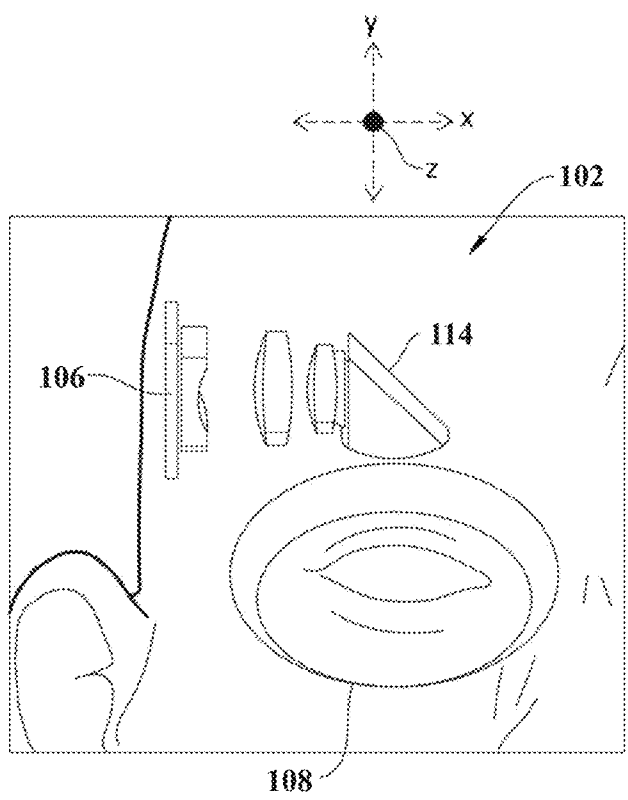
Figure 18:
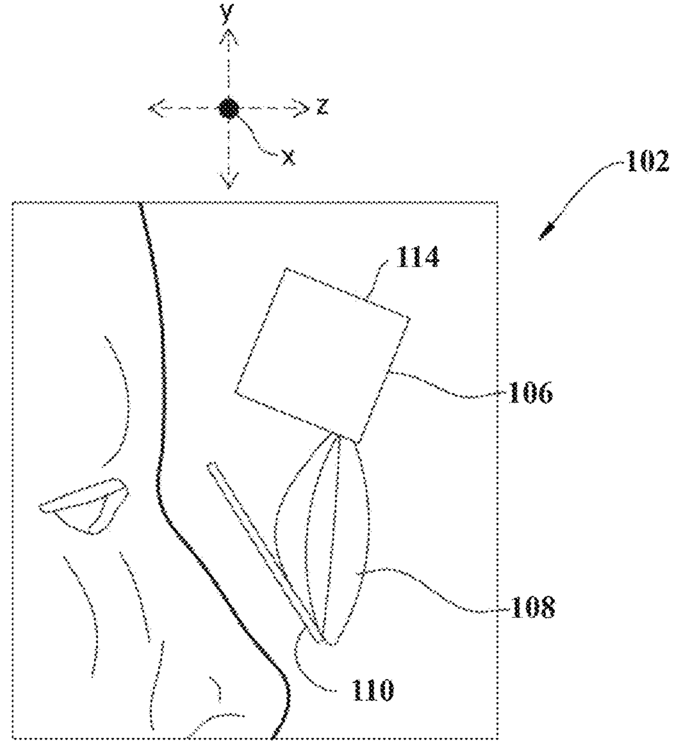
Figure 19:
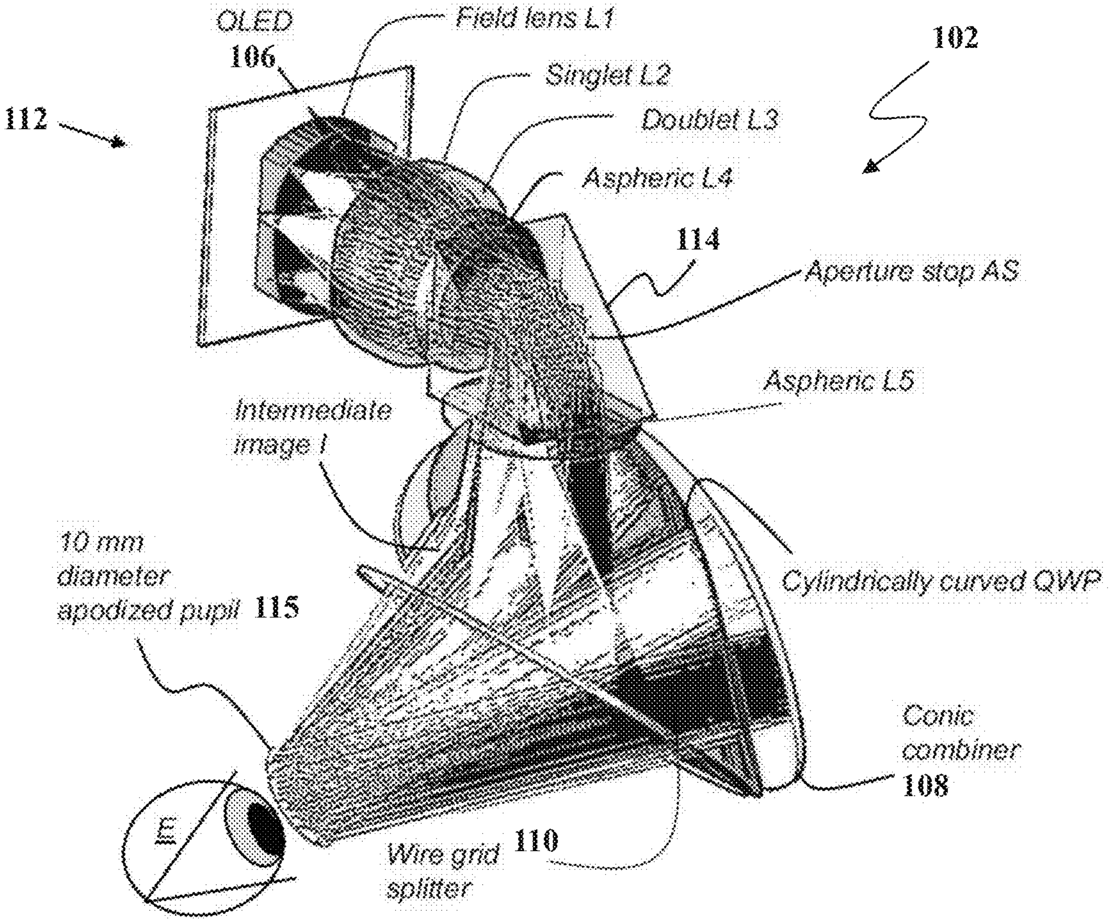
Figure 20:
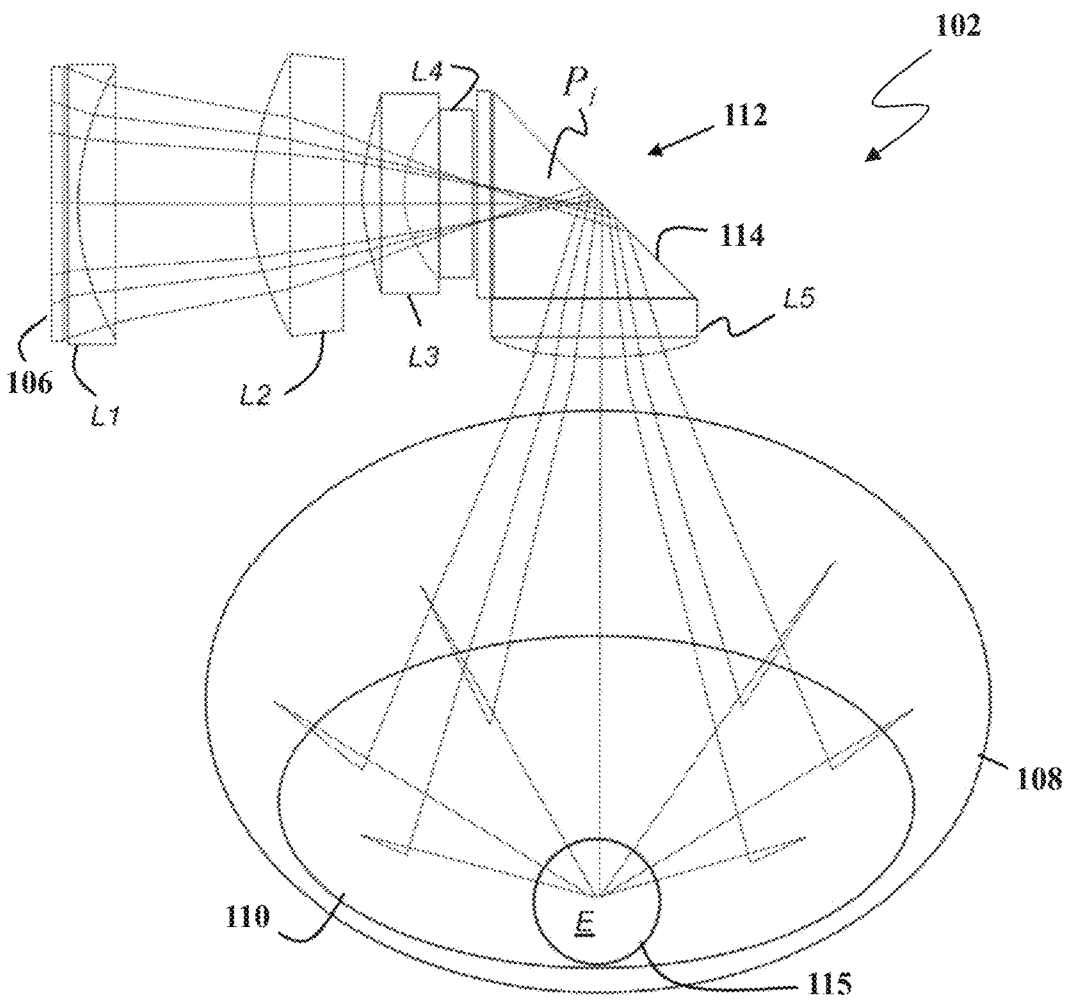

In some embodiments, as shown in FIG. 14, the processor 24 may operate in the scrolling text mode 28 by displaying the modified generated machine-readable text as multiple lines of text 70 arranged in a column 72, animating a current line of scrolling text 74 displayed within a scrolling section 76 of the text display screen 58 to scroll across the text display screen 58 and having a scale factor greater than a scale factor of adjacent lines of text, and animating a subsequent line of text 78 upwardly into the scrolling section 76 after the current line of scrolling text 74 has completed scrolling such that adjacent lines of text are displayed above and below the scrolling section 76. The processor 24 may also modify one of the scale factor, a scroll speed, a brightness, and a contrast of the current line of scrolling text 74 displayed within the scrolling section 76 based on user input. For example, the processor 24 may implement algorithm 300 to operate in OCR mode 26 and scrolling text mode 28 based on inputs received from the user via the wireless hand-held remote 38.

Referring to FIGS. 15-21, in some embodiments, the display system 18 may include a catadioptric pupil-forming optical system 100 that includes a pair of optical engines 102. Each optical engine 102 is associated with a corresponding eye of the user and includes an optical module housing 104 disposed above an eye of the user, an image generator 106 that forms a 2D image, a partially transmissive mirror 108 having a curved reflective surface, a beam splitter 110 disposed to reflect light toward the curved mirror surface 108, and an optical image relay 112 that is housed within the optical module housing 104 and configured to conjugate the formed 2D image at the image generator 106 to a curved focal surface of the partially transmissive mirror 108. The curved focal surface is defined between the curved reflective surface of the partially transmissive mirror 108 and the beam splitter 110.

The optical image relay 112 includes a concave-plano field lens L1 that shapes the light from OLED display image generator 106, providing a beam to a meniscus singlet lens L2. From lens L2, the imaging light goes to a doublet L3 having a concave/convex flint glass lens cemented to a crown glass lens. An aspheric plano-convex lens L4 is in optical contact with the input face of a prism 114, and a second plano-aspheric lens L5 is cemented to the output face of prism 114. This cemented arrangement facilitates alignment of these optical components. The hypotenuse or turning surface of the prism 114 is essentially the relay (and system) aperture stop. An intermediate image I is formed in the shape and location of the focal surface of the curved mirror 108. A cylindrically curved quarter-wave plate (QWP) is positioned between the mirror 108 and the beam splitter 110. Curvature of this element helps to reduce variations of the retardation imparted to the image-bearing light by the QWP over the field of view of the large exit pupil 115. In some embodiments, the image relay 112 includes an actuator 116 and associated components as part of a focal plane adjustment system 118 to change a position of image generator 106. The controller 20 is programmed to execute an algorithm including the steps of receiving image data from the imaging system 14 and operating the image generator 106 to display the received image data onto the curved mirror 108. The image generator 106 may be a display that emits light, such as an organic light-emitting device (OLED) array or a liquid crystal array or a micro-LED array with accompanying lenslets, or some other type of spatial light modulator useful for image generation.

Figure 21:
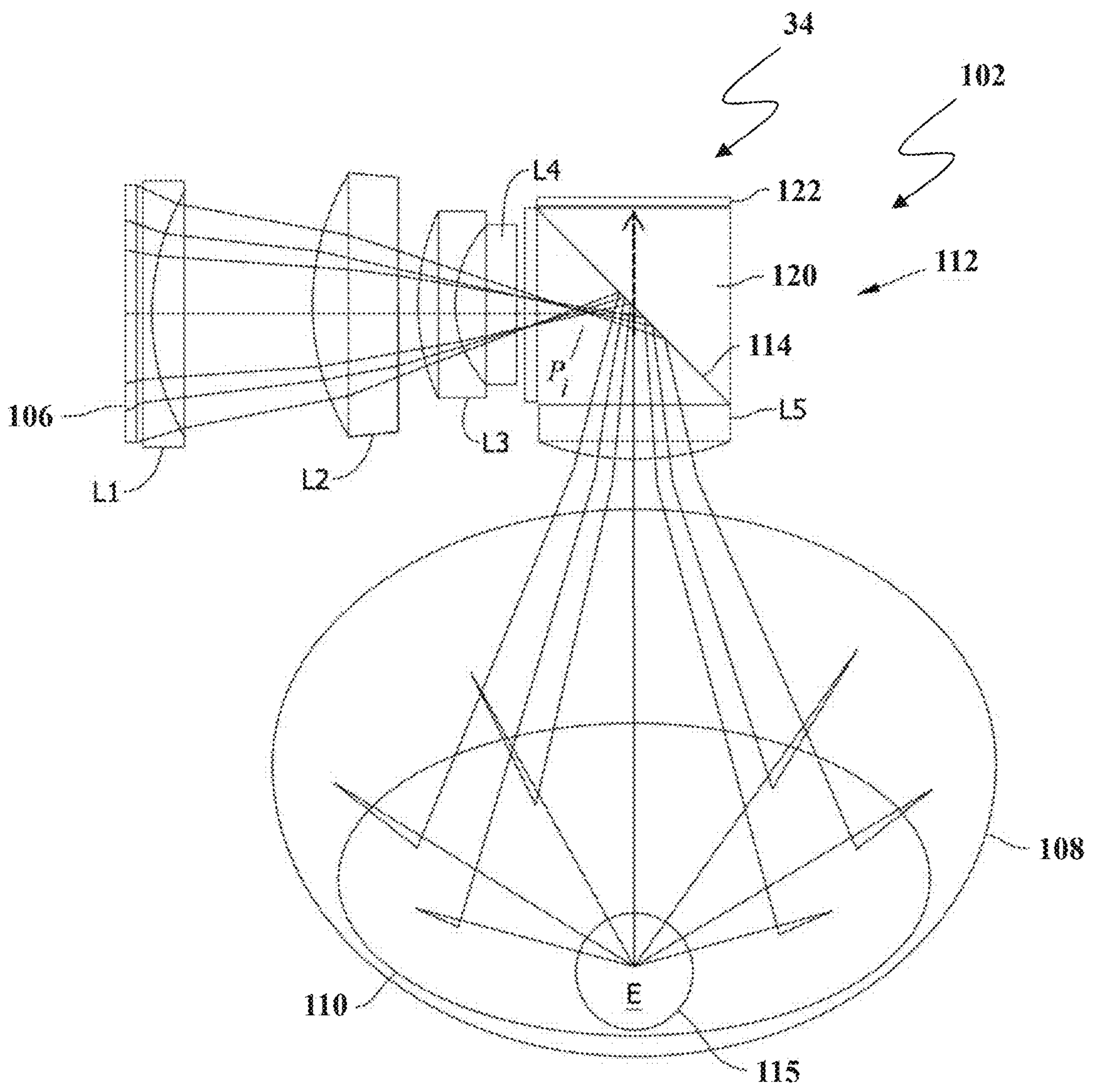
Figure 22:
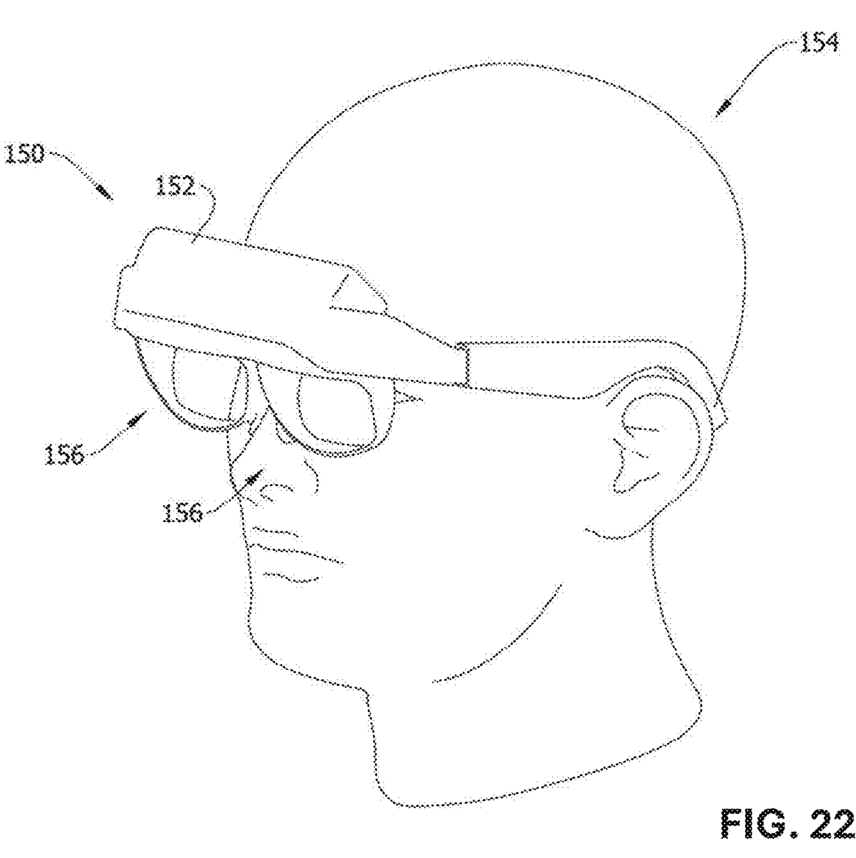
Figure 23:
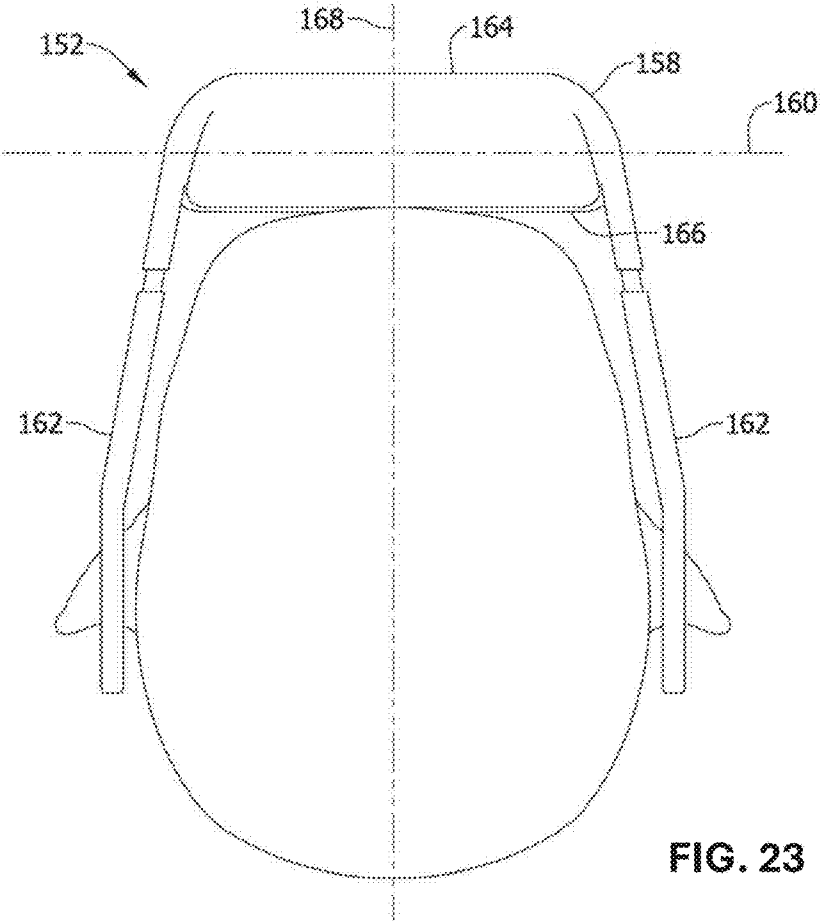
Figure 24:
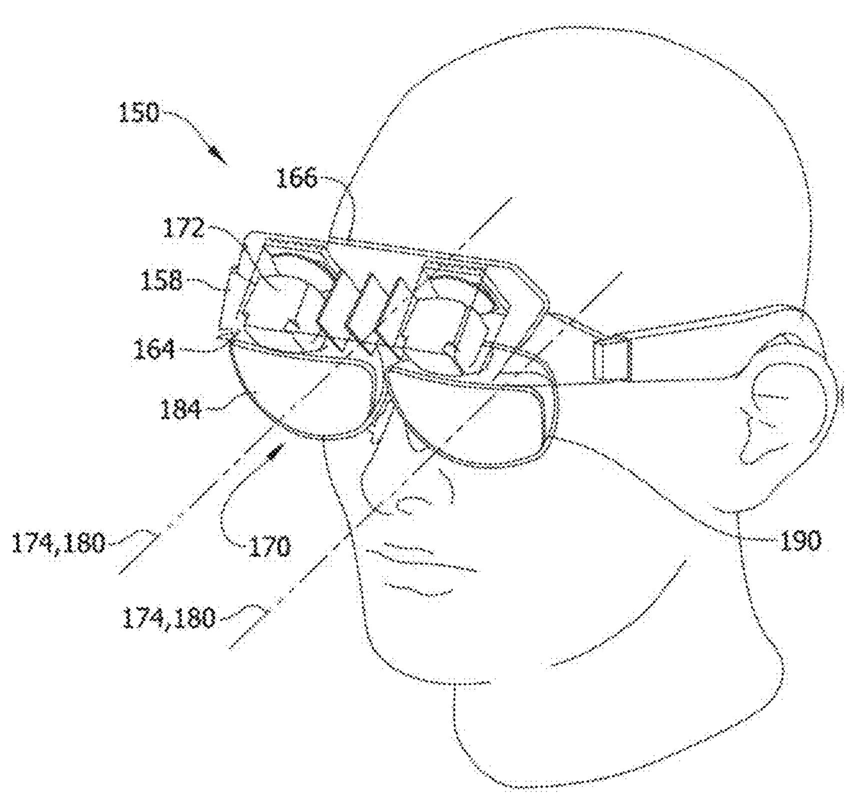
Figure 25:
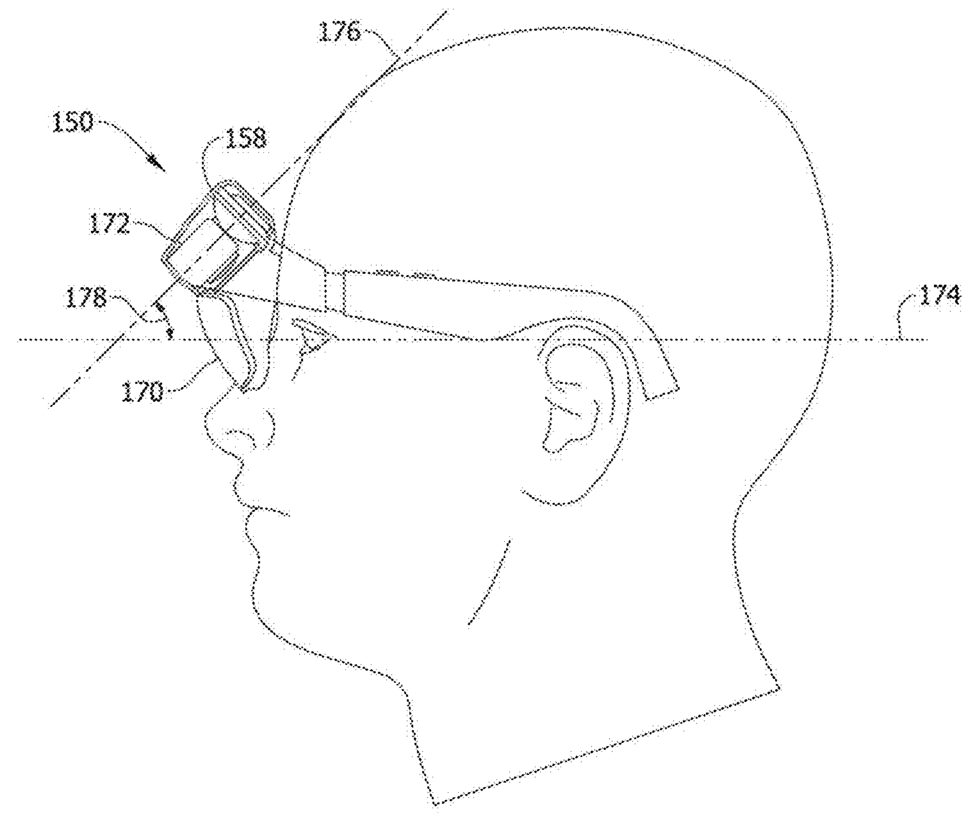
Figure 26:
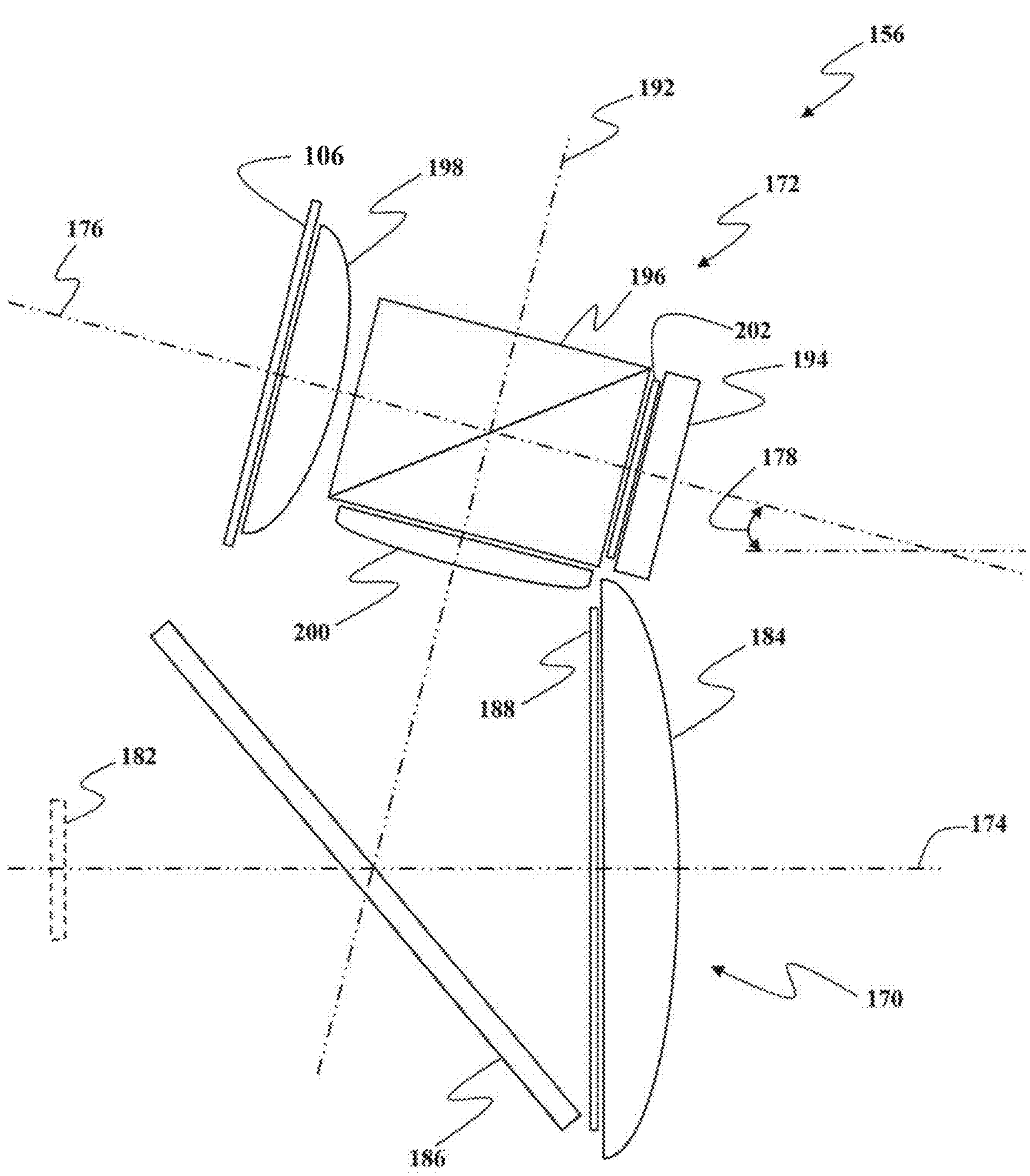
Figure 27:
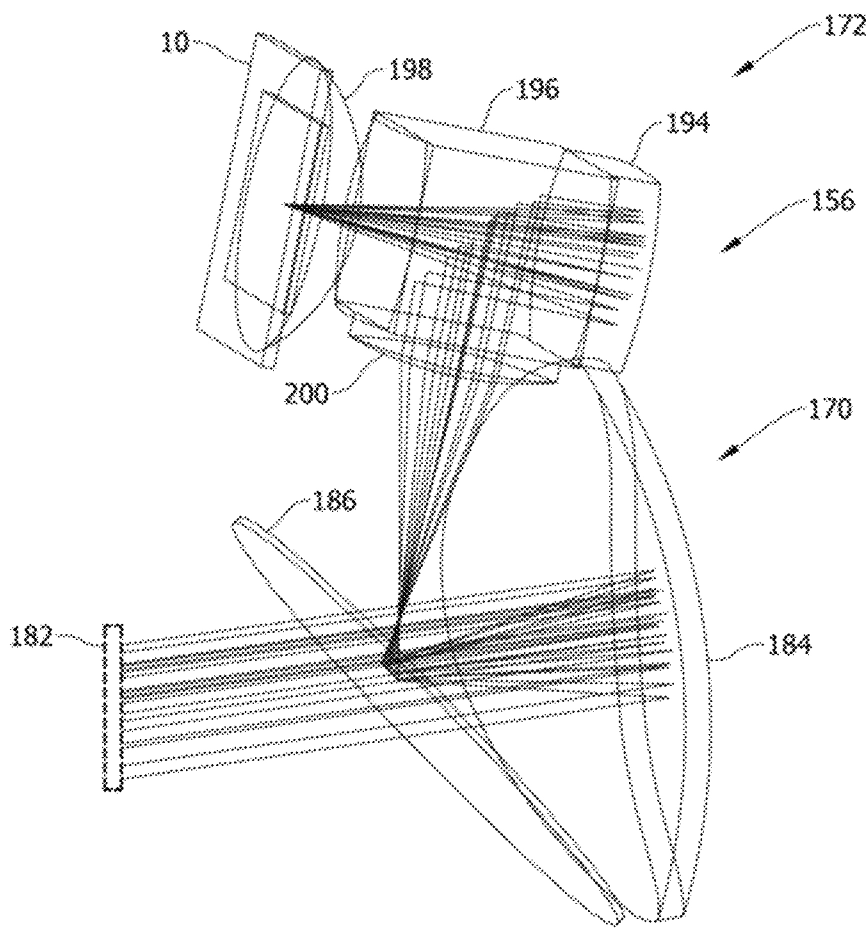
Figure 28:
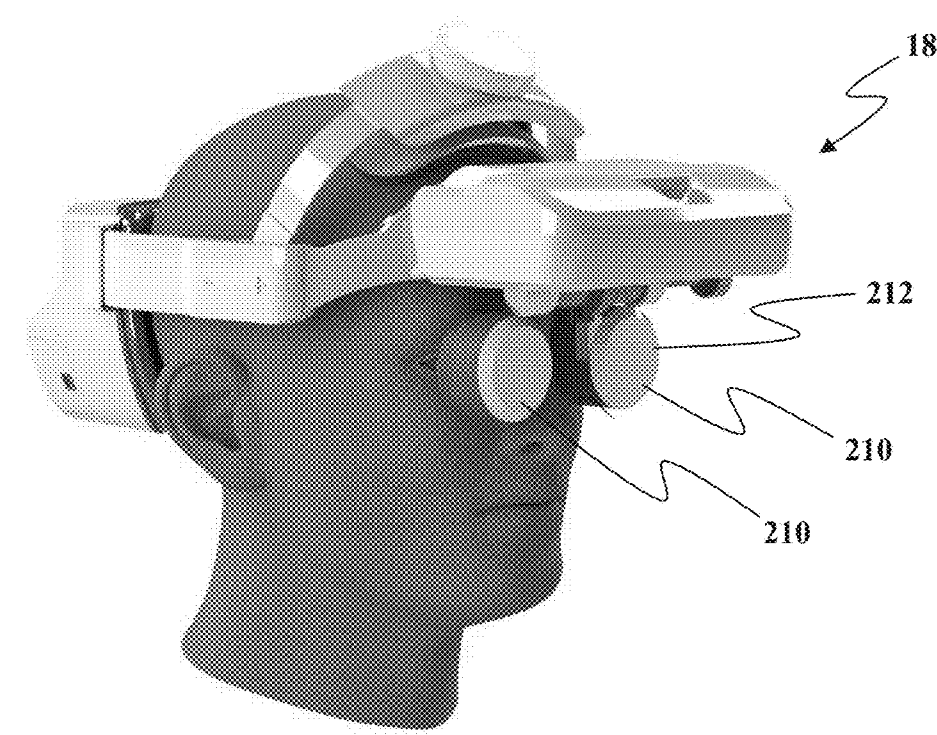
Figure 29:
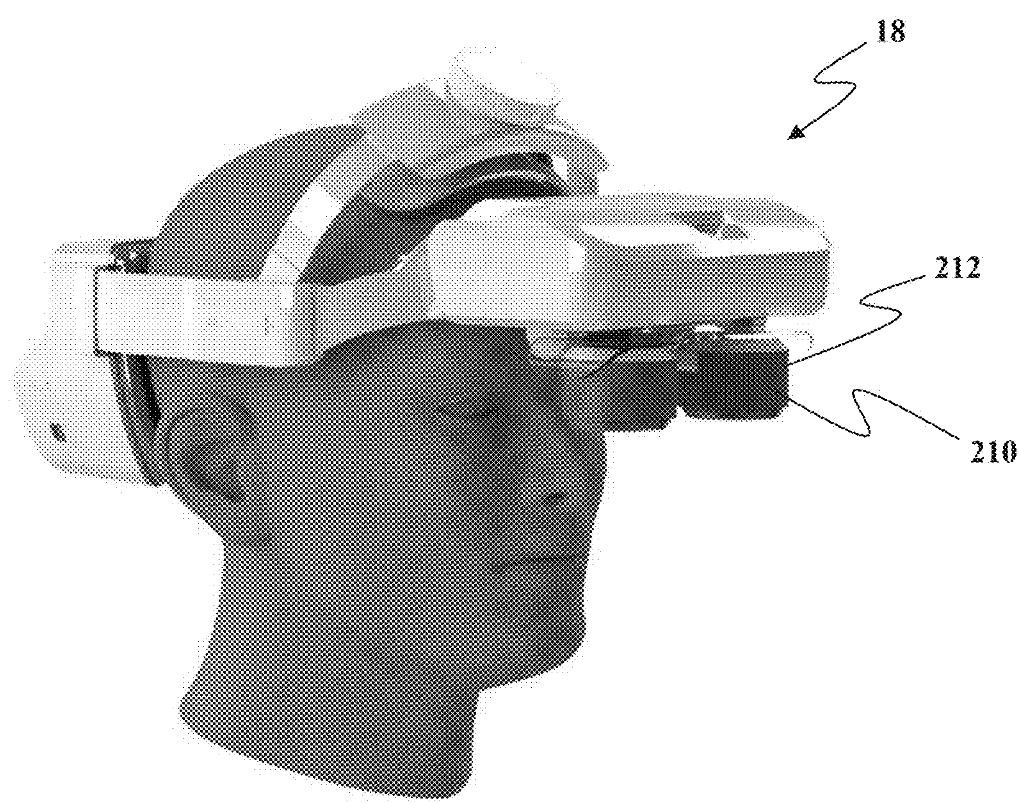
Figures 30, 31:
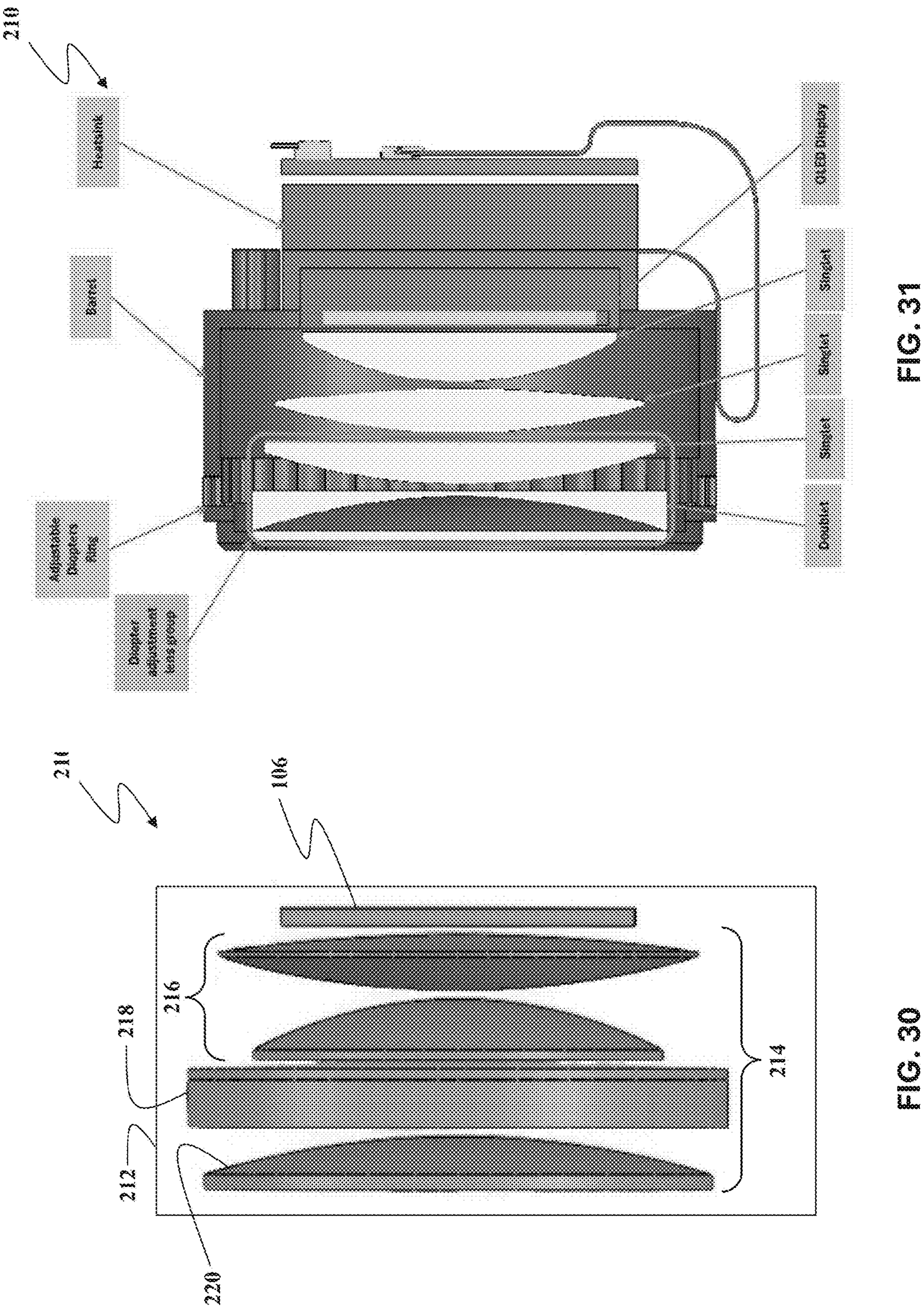

As shown in FIG. 21, in some embodiments, the eye tracking system 34 includes a complementary facing prism 120 coupled to the prism 114 adjacent the folding surface, and a tracking sensor 122 coupled to the complementary facing prism 120. The folding surface includes a dichroic surface treated to direct the sensing light to the beam splitter 110, the curved mirror 108, and to an iris of the user, such that sensing light returning from the iris retraces a light path to the prism 114 and a portion of the returning sensing light is transmitted through the folding surface and conveyed through the complementary facing prism 120 to the tracking sensor 122. The eye tracking system 34 may also include cameras and infrared (IR) light sources provided on a headset, as shown subsequently, can provide the eye-tracking or gaze-tracking function (used herein as the same or similar expression) and corresponding angular measurement data. Gaze tracking can be combined with the controller and with a camera image FOV intake. For instance, change of the image aspect ratio for generated image data content may be appropriate, allowing the system to adapt image content to the dimensional parameters available from the image generation system. Thus, for example, cameras associated with the HMD can oversample the real-world input from the object scene, acquiring a wider FOV than can be displayed by system optics. Gaze tracking identifies the actual FOV available to the viewer. The resulting buffered images are related to the reduced FOV video that can be generated, as controlled by using the sector of the FOV identified using eye gaze recognition.

In some embodiments, the sensor system 36 may include one or more sensors including high-resolution cameras, multiple displays per eye, 6 to 9 degrees of freedom sensor or other sensors necessary for detection of hand-gesturing, head-gesturing, voice control, positional location, and estimation or navigation, as well as Simultaneous Localization and Mapping (SLAM) sensors, microphones and noise-cancelling microphones, and any other sensors which could be coupled to and used on an XR headset.

Additional details of the catadioptric pupil-forming optical system 100, the eye tracking system 34, and the sensor system 36, which may be used in the present invention, are described in U.S. patent application Ser. No. 17/139,167 to David Kessler et al., filed Dec. 31, 2020, titled "Wearable Pupil-Forming Apparatus", which is incorporated herein by reference in its entirety.

Referring to FIGS. 22-27, in some embodiments, the display system 18 may include a compact catadioptric optical engine 150. The compact catadioptric optical engine 150 include an eyeglass frame 152 that may be worn by a viewer 154, and a pair of near-eye pupil forming catadioptric optical engines 156 that are mounted to the eyeglass frame 152. The eyeglass frame 152 includes a support housing 158 that extends along a longitudinal axis 160 between a pair of opposing temple support arms 162. The support housing 158 includes a front portion 164 and a rear portion 166 spaced along a transverse axis 168 that is perpendicular to the longitudinal axis 160. Each near-eye pupil forming catadioptric optical engine 156 includes the image generator 106 forming a 2D image, an optical imaging assembly 170, and an optical image relay assembly 172.

The optical imaging assembly 170 is mounted to the support housing 158 and orientated along a first optical axis 174. The optical image relay assembly 172 is positioned within the support housing 158 and is orientated along a second optical axis 176 that is orientated at an oblique vertical angle 178 from the first optical axis 174. When worn by the viewer 154, the first optical axis 174 is aligned with the optical path 180 of the corresponding eye of the viewer 154. The optical imaging assembly 170 is configured to form an exit pupil 182 along the first optical axis 174 for viewing the 2D image. The optical imaging assembly 170 includes a spherical combiner 184 and a first beam splitter 186 positioned between the spherical combiner 184 and the exit pupil 182 along the first optical axis 174.

In some embodiments, the first beam splitter 186 includes a wire grid beam splitter. In addition, the optical imaging assembly 170 may also include a cylindrically curved quarter wave plate film 188 that is orientated between the spherical combiner 184 and the wire grid beam splitter 186.

In the illustrated embodiment, the spherical combiner 184 is mounted to the front portion 164 of the support housing 158 and extends vertically downward from the front portion 164. For example, in some embodiments, the eyeglass frame 152 includes a pair of rim supports 190 that extend from a bottom portion of the support housing 158. Each spherical combiner 184 is coupled to a corresponding rim supports 190 to support the optical imaging assembly 170 from the support housing 158. In addition, the first beam splitter 186 is coupled to a corresponding rim supports 190 and extends obliquely outwardly from the spherical combiner 184.

In the illustrated embodiment, the optical image relay assembly 172 is configured to is configured to conjugate the formed 2D image from the image generator 106 to a viewer retina and to relay an intermediate exit pupil of the optical image relay assembly 172 to a viewer iris along a third optical axis 192 that is perpendicular to the second optical axis 176. For example, the optical image relay assembly 172 may be configured to conjugate the formed 2D image from the image generator 106 towards the first beam splitter 186 along the third optical axis 192 that is perpendicular to the second optical axis 176. The optical image relay assembly 172 includes a mangin mirror 194, a polarizing beam splitter 196, a field lens 198, and an aspheric lens 200. The mangin mirror 194 is positioned along the second optical axis 176 and is configured to reflect the 2D image along the second optical axis 176 and back towards the image generator 106. The polarizing beam splitter 196 is positioned along the second optical axis 176 between the mangin mirror 194 and the image generator 106 for transmitting the reflected 2D image from the mangin mirror 194 towards the third optical axis 192. The field lens 198 is positioned along the second optical axis 176 between the polarizing beam splitter 196 and the image generator 106 for transmitting the 2D image from the image generator 106 to the polarizing beam splitter 196 along the second optical axis 176. The aspheric lens 200 is positioned along the third optical axis 192 between the polarizing beam splitter 196 and the optical imaging assembly 170 for transmitting the reflected 2D image from the polarizing beam splitter 196 to the first beam splitter 186.

In some embodiments, the optical image relay assembly 172 may include a quarter wave plate 202 that is cemented between the polarizing beam splitter 196 and the mangin mirror 194. In addition, the optical image relay assembly 172 may extend from the front portion 164 of the support housing 158 towards the rear portion x of the support housing along the transverse axis 168. Additional details of the compact catadioptric optical engine 150, which may be used in the present invention, are described in U.S. patent application Ser. No. 18/531,248 to David Kessler at al., filed Dec. 6, 2023, titled "Augmented Reality Near-Eye Pupil-Forming Catadioptric Optical Engine in Glasses Format", which is incorporated herein by reference in its entirety.

Referring to FIGS. 28-31, in some embodiments, the display system 18 may include a pair of pancake lens assemblies 210 pivotable coupled to the headset 12. Each pancake lens assembly 210 includes a housing 212 that contains an image generator 106, and a lens assembly 214 positioned between the image generator 106 and the user's eyes. The lens assembly 214 includes an opposing pair of singlet lenses 216, a doublet lens 218 adjacent a first singlet lens of the opposing pair of singlet lenses 216, and a third singlet lens 220 positioned between the doublet lens 218 and the user's eye.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification. It will be apparent to one having ordinary skill in the art that the specific detail need not be employed to practice according to the present disclosure. In other instances, well-known materials or methods have not been described in detail in order to avoid obscuring the present disclosure.

Reference throughout this specification to “one embodiment,” “an embodiment,” “one example,” or “an example” means that a particular feature, structure, or characteristic described in connection with the embodiment or example is included in at least one embodiment of the present disclosure. Thus, appearances of the phrases “in one embodiment,” “in an embodiment,” “one example,” or “an example” in various places throughout this specification are not necessarily all referring to the same embodiment or example. Furthermore, the particular features, structures, or characteristics may be combined in any suitable combinations and/or sub-combinations in one or more embodiments or examples.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

The invention has been described in detail with particular reference to a presently preferred embodiment, but it will be understood that variations and modifications can be effected within the spirit and scope of the disclosure. The presently disclosed embodiments are therefore considered in all respects to be illustrative and not restrictive. The scope of the invention is indicated by any appended claims, and all changes that come within the meaning and range of equivalents thereof are intended to be embraced therein.

What is claimed is:

1. An extended reality (XR) system comprising:

a headset adapted to be worn by a user;

a camera coupled to the headset;

a display system mounted to the headset for displaying a display screen including computer-generated images thereon; and a controller coupled to the camera and the display system, and including one or more processors programmed to execute an algorithm for operating in an optical character recognition (OCR) mode and a scrolling text mode to display computer-generated images using the display system including the steps of:

operating in the OCR mode to display a text selection screen by:

receiving video images from the camera;

accessing a retinal map associated with the user identifying a non-viewable boundary defining an area of the user’s field of vision associated with low vision;

generating an image distortion zone within the text selection screen associated with the identified non-viewable boundary;

modifying the received video images to adjust a viewable image attribute of a portion of the received video images displayed within the image distortion zone;

displaying the modified video images on the text selection screen; and selecting text images displayed within the modified video images; and operating in the scrolling text mode to display a text display screen by:

generating machine-readable text of the selected text images using optical character recognition (OCR);

modifying the generating machine-readable text using a lightweight language model for text correction; and displaying the modified generated machine-readable text as an animated line of text scrolling across the text display screen.

2. The XR system of claim 1, wherein the one or more processors is programmed to execute the algorithm including the steps of:

operating in the OCR mode by:

increasing a scale factor to adjust the viewable image attribute of a portion of the received video images displayed within the image distortion zone.

3. The XR system of claim 1, wherein the one or more processors is programmed to execute the algorithm including the steps of:

operating in the OCR mode by:

identifying text images displayed within the image distortion zone; and displaying user-selectable text identifiers around portions of the identified text images.

4. The XR system of claim 1, wherein the one or more processors is programmed to execute the algorithm including the steps of:

operating in the OCR mode by:

receiving a tracked location of the user's gaze from an eye tracking system and adjusting a location of the image distortion zone based on the tracked location of the user's gaze.

5. The XR system of claim 1, wherein the one or more processors is programmed to execute the algorithm including the steps of:

operating in the scrolling text mode by:

animating the modified generated machine-readable text as a single line of text scrolling across the text display screen.

6. The XR system of claim 5, wherein the one or more processors is programmed to execute the algorithm including the steps of:

operating in the scrolling text mode by:

displaying the text display screen including the image distortion zone; and animating the single line of text scrolling across the text display screen such that letters appearing adjacent a first edge of the image distortion zone sequentially appear at a second edge of the image distortion zone as the line of text scrolls across the text display screen.

7. The XR system of claim 1, wherein the one or more processors is programmed to execute the algorithm including the steps of:

operating in the scrolling text mode by:

displaying the modified generated machine-readable text as multiple lines of text arranged in a column;

animating a current line of text displayed within a scrolling section of the text display screen to scroll across the text display screen and having a scale factor greater than a scale factor of adjacent lines of text; and animating a subsequent line of text upwardly into the scrolling section after the current line of text has completed scrolling such that adjacent lines of text are displayed above and below the scrolling section.

8. The XR system of claim 7, wherein the one or more processors is programmed to execute the algorithm including the steps of:

modifying one of the scale factor, a scroll speed, a brightness, and a contrast of the current line of text displayed within the scrolling section based on user input.

9. The XR system of claim 1, wherein the display system includes:

a pair of near-eye pupil forming catadioptric optical engines mounted to the headset, each of the near-eye pupil forming catadioptric optical engines including:

an image generator forming a 2D image;

an optical imaging assembly configured to form the display screen as an exit pupil for viewing the 2D image by a viewer, and an optical image relay assembly positioned between the optical imaging assembly and the image generator for conjugating the formed 2D image from the image generator to the optical imaging assembly.

10. A method of operating an extended reality (XR) system including a headset adapted to be worn by a user, a camera coupled to the headset, a display system mounted to the headset for displaying a display screen including computer-generated images thereon, and a controller including one or more processors coupled to the camera and the display system, the method including the one or more processors performing an algorithm for operating in an optical character recognition (OCR) mode and a scrolling text mode to display computer-generated images using the display system including the steps of:

operating in the OCR mode to display a text selection screen by:

receiving video images from the camera;

accessing a retinal map associated with the user identifying a non-viewable boundary defining an area of the user's field of vision associated with low vision;

generating an image distortion zone within the text selection screen associated with the identified non-viewable boundary;

modifying the received video images to adjust a viewable image attribute of a portion of the received video images displayed within the image distortion zone;

displaying the modified video images on the text selection screen; and selecting text images displayed within the modified video images; and operating in the scrolling text mode to display a text display screen by:

generating machine-readable text of the selected text images using optical character recognition (OCR);

modifying the generating machine-readable text using a lightweight language model for text correction; and displaying the modified generated machine-readable text as an animated line of text scrolling across the text display screen.

11. The method of claim 10, including the one or more processors performing the algorithm including the steps of:

operating in the OCR mode by:

increasing a scale factor to adjust the viewable image attribute of a portion of the received video images displayed within the image distortion zone.

12. The method of claim 10, including the one or more processors performing the algorithm including the steps of:

operating in the OCR mode by:

identifying text images displayed within the image distortion zone; and displaying user-selectable text identifiers around portions of the identified text images.

13. The method of claim 10, including the one or more processors performing the algorithm including the steps of:

operating in the OCR mode by:

receiving a tracked location of the user's gaze from an eye tracking system and adjusting a location of the image distortion zone based on the tracked location of the user's gaze.

14. The method of claim 10, including the one or more processors performing the algorithm including the steps of:

operating in the scrolling text mode by:

animating the modified generated machine-readable text as a single line of text scrolling across the text display screen.

15. The method of claim 14, including the one or more processors performing the algorithm including the steps of:

operating in the scrolling text mode by:

displaying the text display screen including the image distortion zone; and animating the single line of text scrolling across the text display screen such that letters appearing adjacent a first edge of the image distortion zone sequentially appear at a second edge of the image distortion zone as the line of text scrolls across the text display screen.

16. The method of claim 10, including the one or more processors performing the algorithm including the steps of:

operating in the scrolling text mode by:

displaying the modified generated machine-readable text as multiple lines of text arranged in a column;

animating a current line of text displayed within a scrolling section of the text display screen to scroll across the text display screen and having a scale factor greater than a scale factor of adjacent lines of text; and animating a subsequent line of text upwardly into the scrolling section after the current line of text has completed scrolling such that adjacent lines of text are displayed above and below the scrolling section.

17. The method of claim 16, including the one or more processors performing the algorithm including the steps of:

modifying one of the scale factor, a scroll speed, a brightness, and a contrast of the current line of text displayed within the scrolling section based on user input.

18. The method of claim 10, wherein the display system includes:

a pair of near-eye pupil forming catadioptric optical engines mounted to the headset, each of the near-eye pupil forming catadioptric optical engines including:

an image generator forming a 2D image;

an optical imaging assembly configured to form the display screen as an exit pupil for viewing the 2D image by a viewer, and an optical image relay assembly positioned between the optical imaging assembly and the image generator for conjugating the formed 2D image from the image generator to the optical imaging assembly.

19. A non-transitory computer-readable storage media having computer-executable instructions embodied thereon to operate an extended reality (XR) system including a headset adapted to be worn by a user, a camera coupled to the headset, a display system mounted to the headset for displaying a display screen including computer-generated images thereon, and a controller including one or more processors coupled to the camera and the display system, when executed by the one or more processors the computer-executable instructions cause the one or more processors to perform an algorithm for operating in an optical character recognition (OCR) mode and a scrolling text mode to display computer-generated images using the display system including the steps of:

operating in the OCR mode to display a text selection screen by:

receiving video images from the camera;

accessing a retinal map associated with the user identifying a non-viewable boundary defining an area of the user's field of vision associated with low vision;

generating an image distortion zone within the text selection screen associated with the identified non-viewable boundary;

modifying the received video images to adjust a viewable image attribute of a portion of the received video images displayed within the image distortion zone;

displaying the modified video images on the text selection screen; and selecting text images displayed within the modified video images; and operating in the scrolling text mode to display a text display screen by:

generating machine-readable text of the selected text images using optical character recognition (OCR);

modifying the generating machine-readable text using a lightweight language model for text correction; and displaying the modified generated machine-readable text as an animated line of text scrolling across the text display screen.

20. The non-transitory computer-readable storage media of claim 19, wherein the display system includes:

a pair of near-eye pupil forming catadioptric optical engines mounted to the headset, each of the near-eye pupil forming catadioptric optical engines including:

an image generator forming a 2D image;

an optical imaging assembly configured to form the display screen as an exit pupil for viewing the 2D image by a viewer, and an optical image relay assembly positioned between the optical imaging assembly and the image generator for conjugating the formed 2D image from the image generator to the optical imaging assembly.

* * * * *